(12) United States Patent
Hurter

(10) Patent No.: US 11,359,616 B2
(45) Date of Patent: Jun. 14, 2022

(54) SUPERCRITICAL WATER USED FUEL OIL PURIFICATION APPARATUS AND PROCESS

(71) Applicant: Anthony George Hurter, Monaco (MC)

(72) Inventor: Anthony George Hurter, Monaco (MC)

(*) Notice: Subject to any disclaimer, the term of this patent is extended or adjusted under 35 U.S.C. 154(b) by 0 days.

(21) Appl. No.: 16/590,518

(22) Filed: Oct. 2, 2019

(65) Prior Publication Data

US 2020/0116140 A1    Apr. 16, 2020

Related U.S. Application Data

(63) Continuation of application No. 15/306,838, filed as application No. PCT/IB2014/060735 on Apr. 30, 2014, now abandoned.

(51) Int. Cl.
| F04B 23/06 | (2006.01) |
| F04B 15/02 | (2006.01) |
| F04B 15/04 | (2006.01) |
| B08B 9/055 | (2006.01) |
| F16L 55/46 | (2006.01) |

(52) U.S. Cl.
CPC ............. *F04B 23/06* (2013.01); *B08B 9/055* (2013.01); *F04B 15/02* (2013.01); *F04B 15/04* (2013.01); *F16L 55/46* (2013.01)

(58) Field of Classification Search
CPC .......... F04B 23/06; F04B 15/02; F04B 13/00; F04B 2201/0201; B08B 9/055; B08B 7/0021; F16L 55/46
USPC ........ 134/166 R, 10, 110, 184, 100.1, 102.2, 134/166 C; 417/53, 2, 313, 521, 254, 417/44.2, 426, 259
See application file for complete search history.

(56) References Cited

U.S. PATENT DOCUMENTS

| 2,700,876 A |   | 2/1955 | Gagnan |   |
| 3,516,761 A | * | 6/1970 | Scroggins | F04B 9/1378 417/259 |
| 3,893,790 A | * | 7/1975 | Mayer | F15B 3/00 417/346 |
| 3,908,862 A | * | 9/1975 | Chandra | G05D 11/132 222/63 |
| 4,021,156 A | * | 5/1977 | Fuchs, Jr. | F01L 25/063 417/346 |

(Continued)

FOREIGN PATENT DOCUMENTS

| EP | 1637735 A1 | 3/2006 |
| WO | 2013017669 A1 | 2/2013 |

OTHER PUBLICATIONS

Examination Report dated Mar. 18, 2019, issued in European Patent Application No. 14891077.1.

(Continued)

*Primary Examiner* — Michael E Barr
*Assistant Examiner* — Thomas Bucci
(74) *Attorney, Agent, or Firm* — Grossman, Tucker, Perreault & Pfleger, PLLC

(57) ABSTRACT

This present disclosure relates to feeding and discharging fluids to and from a high-pressure process and is described using the example of supercritical water treatment of used oil. The apparatus comprises a fluid feed pump that feeds unprocessed process fluid into a high-pressure process, a fluid discharge pump and a fluid pressure buffer system.

13 Claims, 17 Drawing Sheets

(56) References Cited

U.S. PATENT DOCUMENTS

| | | | | |
|---|---|---|---|---|
| 4,090,695 A | * | 5/1978 | Stone | B29C 67/246 366/76.2 |
| 4,263,602 A | * | 4/1981 | Matsumoto | B41J 2/17596 222/318 |
| 4,310,420 A | * | 1/1982 | Konishi | B01D 15/14 210/101 |
| 4,494,676 A | * | 1/1985 | Berweger | F04B 13/02 222/63 |
| 5,897,781 A | * | 4/1999 | Dourdeville | F04B 49/065 210/656 |
| 6,113,368 A | * | 9/2000 | Hofmann | F04B 9/1174 417/53 |
| 6,116,025 A | | 9/2000 | Tucker | |
| 6,228,153 B1 | * | 5/2001 | Saitoh | B01D 19/0068 210/180 |
| 6,612,317 B2 | * | 9/2003 | Costantini | H01L 21/67034 134/58 R |
| 7,063,785 B2 | * | 6/2006 | Hiraku | F04B 11/0058 210/101 |
| 7,335,296 B2 | * | 2/2008 | Arai | B01J 3/006 210/138 |
| 7,562,663 B2 | * | 7/2009 | Muraoka | B08B 7/0021 134/100.1 |
| 7,850,431 B2 | * | 12/2010 | Gonnella | F04B 41/06 417/44.2 |
| 8,292,598 B2 | * | 10/2012 | Laverdiere | F04B 49/065 417/274 |
| 8,444,399 B2 | * | 5/2013 | West | F04B 43/113 417/522 |
| 9,309,872 B2 | * | 4/2016 | Gonnella | F04B 25/00 |
| 2004/0020082 A1 | * | 2/2004 | Ariga | E02F 9/2296 37/236 |
| 2005/0061722 A1 | * | 3/2005 | Takao | F04B 9/02 210/137 |
| 2005/0063839 A1 | * | 3/2005 | Kazumasa | F04B 13/00 417/415 |
| 2006/0029503 A1 | * | 2/2006 | Takehana | F04B 7/04 417/437 |
| 2006/0107660 A1 | * | 5/2006 | Kawamura | F16H 61/4139 60/413 |
| 2006/0272495 A1 | * | 12/2006 | Ohashi | F04B 17/05 91/472 |
| 2007/0020131 A1 | * | 1/2007 | Schroeder | F02M 59/102 417/521 |
| 2007/0104586 A1 | * | 5/2007 | Cedrone | F04B 49/065 417/26 |
| 2007/0110590 A1 | * | 5/2007 | Pabst | F04B 53/16 417/273 |
| 2007/0125797 A1 | * | 6/2007 | Cedrone | F04B 13/00 222/14 |
| 2007/0127511 A1 | * | 6/2007 | Cedrone | F04B 49/065 370/402 |
| 2007/0128046 A1 | * | 6/2007 | Gonnella | F04B 43/088 417/2 |
| 2007/0128047 A1 | * | 6/2007 | Gonnella | F04B 41/06 417/2 |
| 2007/0128050 A1 | * | 6/2007 | Cedrone | F04B 53/06 417/244 |
| 2007/0130930 A1 | * | 6/2007 | Wanschura | F04B 23/06 60/444 |
| 2007/0144166 A1 | * | 6/2007 | Rueckgauer | F16H 61/44 60/485 |
| 2007/0144169 A1 | * | 6/2007 | Ohashi | F04B 1/324 60/488 |
| 2007/0177998 A1 | * | 8/2007 | Kato | F04B 7/02 417/395 |
| 2007/0196219 A1 | * | 8/2007 | Hofling | F04B 9/1178 417/347 |
| 2008/0011781 A1 | * | 1/2008 | Yajima | B05C 11/1039 222/146.1 |
| 2008/0056921 A1 | * | 3/2008 | Pasquan | F04B 47/02 417/529 |
| 2009/0280034 A1 | * | 11/2009 | Ballu | G05D 11/133 422/105 |
| 2010/0024906 A1 | * | 2/2010 | Moeller | F04B 23/06 137/565.31 |
| 2010/0037967 A1 | | 2/2010 | Lu | |
| 2010/0040483 A1 | * | 2/2010 | Berger | F04B 23/06 417/205 |
| 2010/0290937 A1 | * | 11/2010 | Trout | F04B 23/06 417/418 |
| 2012/0018010 A1 | * | 1/2012 | Gaumnitz | F04B 7/0076 137/485 |
| 2012/0045348 A1 | * | 2/2012 | Garry | F04B 23/06 417/302 |
| 2012/0241469 A1 | * | 9/2012 | Takeishi | F04B 43/06 222/1 |
| 2012/0283882 A1 | * | 11/2012 | Du | G05D 16/2073 700/282 |
| 2012/0301328 A1 | * | 11/2012 | Adler | F04B 15/08 417/246 |
| 2012/0308409 A1 | * | 12/2012 | Levine | F04B 43/12 417/274 |
| 2013/0104631 A1 | * | 5/2013 | Tokuo | F04B 13/00 73/61.56 |
| 2013/0142672 A1 | * | 6/2013 | Blackson | F04B 23/00 417/53 |
| 2013/0270157 A1 | | 10/2013 | Ferrara | |
| 2013/0283929 A1 | * | 10/2013 | Ando | G01F 1/66 73/861.27 |
| 2013/0336803 A1 | * | 12/2013 | Ruegenberg | F04B 49/20 417/12 |
| 2014/0034584 A1 | * | 2/2014 | Marumoto | H01L 21/6715 210/808 |
| 2014/0127037 A1 | * | 5/2014 | Uchida | F04B 11/005 417/53 |
| 2014/0147296 A1 | | 5/2014 | Hoehne | |
| 2014/0154099 A1 | * | 6/2014 | Sivaramakrishnan | F04B 53/14 417/53 |
| 2014/0161627 A1 | * | 6/2014 | Sivaramakrishnan | F04B 11/0058 417/2 |
| 2014/0318224 A1 | * | 10/2014 | Onoda | G01N 30/32 73/61.56 |
| 2014/0374356 A1 | * | 12/2014 | Went | F04B 1/146 210/652 |
| 2015/0092167 A1 | * | 4/2015 | Terashita | H01L 21/67017 355/30 |
| 2015/0330374 A1 | * | 11/2015 | Hudelmaier | F04B 11/005 137/1 |

OTHER PUBLICATIONS

Office Action dated Apr. 2, 2019, issued in U.S. Appl. No. 15/306,838, 24 pages.

Notice of References Cited in Office Action dated Apr. 2, 2019, issued in U.S. Appl. No. 15/306,838, 5 pages.

U.S. Appl. No. 15/306,838, filed Oct. 26, 2016.

International Search Report dated Sep. 16, 2014, issued in PCT Patent Application No. PCT/IB2014/060735, 4 page.

International Written Opinion dated Sep. 16, 2014, issued in PCT Patent Application No. PCT/IB2014/060735, 8 page.

* cited by examiner

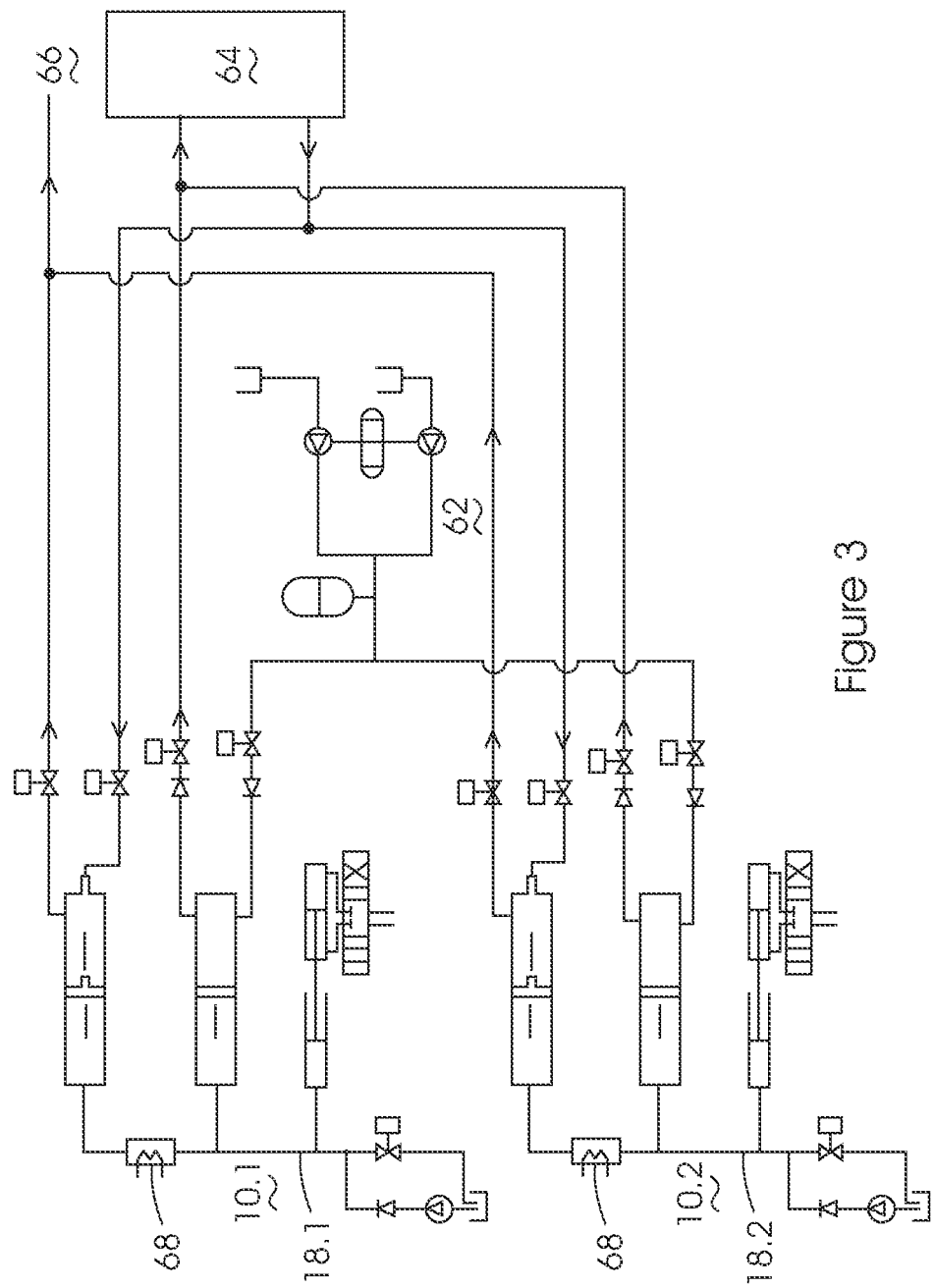

SUPERCRITICAL WATER USED FUEL OIL PURIFICATION APPARATUS AND PROCESS

CROSS-REFERENCE TO RELATED APPLICATION

This application is a continuation of U.S. patent application Ser. No. 15/306,838 filed Oct. 26, 2016, which is a National Stage of International (PCT) Application No. PCT/IB2014/060735 filed on Apr. 30, 2014, the entire content of all of which is fully incorporated herein by reference.

FIELD OF THE INVENTION

This invention relates to apparatus and methods for feeding and discharging fluids that require high pressure feed into a high pressure process and subsequent pressure reduction upon discharge from the process.

In addition, this invention relates to pipeline pig cleaning apparatus and methods for use with such apparatus and processes.

BACKGROUND TO THE INVENTION

There are a number of processes that require high pressure fluid feeds and subsequent product fluid pressure let down after processing.

An example of such a process is the use of supercritical fluids to treat a feed fluid. In such a process, the feed fluid requires a high pressure in-feed into the process and the product fluid requires fluid pressure let down upon discharge from the process. In these processes, the pressure of the feed fluid (the feedstock or fluid fed into the process for treatment) is raised to process pressure, typically to the operating pressure of the processing reactor in which the feed fluid is processed. The processed or product fluid (the fluid product resulting from processing in the process or reactor) is then discharged and the pressure thereof is reduced, typically to ambient pressure. The term "process fluid" is used to describe either or both the feed fluid and the product fluid.

A more specific example of such a process is the use of supercritical water to treat a used oil feedstock or feed fluid at temperatures and pressures at or above the critical point of water. The invention will be described with reference to such apparatus and processes by way of non-limiting examples.

The recycling of used oil, particularly lubrication oil, is essentially a process of recovering the base oil by separating it from the additives, degradation products and contaminants acquired during the use or collection of the oil. Lubricating oils are typically formulated by mixing lubricant bases with additives, some of which contain metals, to confer on the oil the qualities demanded by the application of the oil, including resistance to oxidation, shearing, temperature, emulsification and foaming and low variability of viscosity with temperature to mention but a few properties. During use the oil tends to incorporate degradation products, including lighter petroleum fractions such as naphtha and gas-oil and heavier fractions such as asphalts and coke. In addition, the oil tends to acquire contaminants during use and collection, such as water, cleaning products, solvents and accumulated dirt, including earth and metal particles.

It is an object of this invention to provide apparatus and processes to elevate a feed fluid pressure to reactor pressure; to feed the feed fluid under reactor pressure into the reactor where the feed fluid is processed into a product fluid; to discharge the product fluid from the reactor at reactor pressure; and finally to reduce the product fluid pressure to a desired (lower) end pressure for further use, processing or storage.

In many processes, such as used lubrication oil recycling for instance, the product fluid exits the reactor as a multi-phase liquid with readily separable, substantially immiscible phases. It is a further objective of this invention to provide a pressure let-down mechanism configured to minimise turbulence during pressure let-down with a view to minimising remixing of the liquid phases during pressure reduction of the product fluid.

Several fluid treatment processes tend to develop reactor and pipeline precipitation that is not removed as a result of process fluid circulation and it is yet a further object of this invention to provide pipeline pig apparatus configured for operation with the apparatus and processes of the invention.

SUMMARY OF THE INVENTION

This invention provides fluid feed and discharge apparatus for feeding a process fluid to and from a process that operates at a pressure substantially different from the ambient pressure surrounding the process.

For the sake of clarity, the invention is described and claimed with reference to a relatively high pressure process. In addition and regardless of the examples used to illustrate the principles of the invention, it is not the absolute pressure of the process that is relevant. Rather it is the relative pressure of the process taken in relation to the ambient pressure within which the process is operated.

According to this invention fluid feed and discharge apparatus is provided for feeding a process fluid to and from a relatively high pressure process including a process in-feed and a process out-feed by means of which, respectively, unprocessed process fluid is fed into and processed process fluid is fed from the high pressure process, the apparatus comprising:
- at least one fluid feed pump for feeding unprocessed process fluid into the high pressure process;
- at least one fluid discharge pump for discharging the processed process fluid fed from the high pressure process; and
- a fluid pressure buffer system including at least one buffer fluid pump that is in fluid communication with the fluid feed and fluid discharge pumps.

The fluid feed and fluid discharge pumps each comprise a free piston reciprocally mounted within a cylinder dividing the cylinder into process fluid and buffer fluid sections, the process fluid sections of the cylinders each having a valve controlled inlet and outlet and the buffer fluid sections of the cylinders being in fluid communication by means of the fluid pressure buffer system.

The fluid feed pump is connected, at its inlet, to a supply of unprocessed process fluid under relatively low pressure and, at its outlet, to a process in-feed by means of which unprocessed process fluid is fed to the process under process pressure. The fluid discharge pump is connected, at its inlet, to a process out-feed by means of which processed process fluid is fed to the fluid discharge pump under process pressure and, at its outlet, to a processed fluid discharge facility, such as a storage tank, under relatively low pressure.

The pumps are provided with valve means configured alternately to open and close the process fluid sections of the cylinders to relatively high process pressure and relatively low fluid in-feed and discharge pressure in alternating high- and low-pressure cycles.

In the low-pressure cycle:
the fluid feed pump inlet and outlet are open and closed respectively to connect the process fluid section of the fluid feed pump to the supply of unprocessed process fluid under relatively low pressure; and
the fluid discharge pump inlet and outlet are closed and open respectively to connect the process fluid section of the fluid discharge pump to the discharge facility under relatively low pressure.

With both sets of valves open to to relatively low or ambient pressure, pressure in the cylinders is essentially equalised at low/ambient pressure.

In the high-pressure cycle:
the fluid feed pump inlet and outlet are closed and open respectively to connect the process fluid section of the fluid feed pump to the process by way of the process in-feed; and
the fluid discharge pump inlet and outlet are open and closed respectively to connect the process fluid section of the fluid discharge pump to the process by way of the process out-feed.

With both sets of valves open to to relatively high process pressure, pressure in the cylinders is essentially equalised at process pressure.

The buffer fluid pump is repeatedly operable:
in the low-pressure cycle, to reciprocate the pistons in the fluid feed pump and fluid discharge pump under the relatively low supply pressure of unprocessed process fluid filling the process fluid section of the fluid feed pump and to discharge the processed process fluid from the process fluid section of the fluid discharge pump to the discharge facility; and
in the high-pressure cycle, to reciprocate the pistons in the fluid feed pump and fluid discharge pump under the relatively high process pressure of processed process fluid filling the process fluid section of the fluid discharge pump and to feed the unprocessed process fluid in the process fluid section of the fluid feed pump by way of the process in-feed to the process under process pressure.

The free pistons reciprocally mounted within the fluid feed and fluid discharge pumps may conveniently be entirely free-floating and linked only hydraulically to the fluid pressure buffer system.

Alternatively, the free piston in at least the fluid feed pump may be mechanically linked to the fluid pressure buffer system, the free piston being connected by means of a piston rod to a piston reciprocally mounted within the buffer fluid pump.

The unprocessed process fluid is preferably fed from a fluid supply assembly comprising at least two pumps driven in a predetermined ratio to mix and feed the unprocessed process fluid in an equivalent ratio.

To assist in equalising fluid discharge pressures and reducing discharge turbulence, the fluid discharge pump may conveniently include a mini-piston configured to penetrate and occlude an enlarged mini-cylinder formed about the opening of the fluid discharge pump outlet, the mini-piston being configured to enter the mini-cylinder and to raise the pressure in the mini-cylinder between the mini-piston and the fluid discharge pump inlet valve to a pressure at or near process pressure, thereby allowing the valve to open with a reduced pressure drop across its seat.

The fluid feed and discharge apparatus of the invention is preferably configured to include a pipeline pig cleaning system including a pig insertion station, a fluid feed pump pig holdback assembly, a fluid discharge pump pig holdback assembly and a pig recovery station, the pig system including a plurality of pipeline pigs that are configured for feeding into the fluid lines of the apparatus at the pig insertion station and transportation through the fluid lines by the movement of the process fluid through the lines, the fluid feed pump inlet and outlet and the fluid discharge pump inlet and outlet being configured as through-flow, valve controlled lines connected on either side of a combination inlet/outlet line extending from the fluid feed pump and the fluid discharge pump, respectively.

The pig insertion station preferably includes an intermittently operable, for instance solenoid operated, pig holdback assembly that is configured to release a predetermined quantity of pigs intermittently into the apparatus fluid lines. The pigs are preferably released a single pig per pump stroke. Pig release is preferably timed for the low-pressure cycle of the fluid feed and fluid discharge pumps, the pig release being timed to ensure that the pigs are released into the fluid line only when the fluid feed pump inlet valve is fully open and fluid is flowing to the fluid feed pump.

The fluid feed and discharge apparatus of the invention may conveniently include at least two additional pumps configured to operate as fluid accumulators, the first pump being open to the process in-feed end of the fluid feed pump and configured to operate as an unprocessed fluid accumulator, the second pump being open to the process out-feed end of the fluid discharge pump and configured to act as a processed fluid accumulator, both accumulators being acted upon by a plunger pump that is in fluid communication with the accumulators and configured to operate the accumulators in contraflow to the fluid feed and fluid discharge pump assembly.

The invention includes fluid feed and discharge apparatus such as that described above, but then optimised for supercritical water treatment of used oil and preferably used lubrication oil.

The invention includes a method of feeding and discharging a process fluid to and from a relatively high pressure process that includes a process in-feed and a process out-feed by means of which, respectively, unprocessed process fluid is fed into and processed process fluid is fed from the high pressure process, the method comprising the steps of:
from at least one fluid feed pump, feeding unprocessed process fluid into the high pressure process;
from at least one fluid discharge pump, discharging the processed process fluid fed from the high pressure process;
the fluid feed and fluid discharge pumps each comprising a free piston reciprocally mounted within a cylinder dividing the cylinder into process fluid and buffer fluid sections, the process fluid sections of the cylinders each having a valve controlled inlet and outlet and the buffer fluid sections of the cylinders being in fluid communication by means of the fluid pressure buffer system;
connecting a fluid pressure buffer system including at least one buffer fluid pump, in fluid communication with the fluid feed and fluid discharge pumps;
connecting the fluid feed pump, at its inlet, to a supply of unprocessed process fluid under relatively low pressure and, at its outlet, to a process in-feed by means of which unprocessed process fluid may be fed to the process under process pressure;
connecting the fluid discharge pump, at its inlet, to a process out-feed by means of which processed process fluid may be fed to the fluid discharge pump under process pressure and, at its outlet, to a processed fluid discharge facility under relatively low pressure;

the pumps including valve means configured alternately to open and close the process fluid sections of the cylinders to relatively high process pressure and relatively low fluid in-feed and discharge pressure in alternating high- and low-pressure cycles and the method including the steps of operating the valves such that:

in the low-pressure cycle, the fluid feed pump inlet and outlet are open and closed respectively to connect the process fluid section of the fluid feed pump to the supply of unprocessed process fluid under relatively low pressure and the fluid discharge pump inlet and outlet are closed and open respectively to connect the process fluid section of the fluid discharge pump to the discharge facility under relatively low pressure; and in the high-pressure cycle, the fluid feed pump inlet and outlet are closed and open respectively to connect the process fluid section of the fluid feed pump to the process by way of the process in-feed and the fluid discharge pump inlet and outlet are open and closed respectively to connect the process fluid section of the fluid discharge pump to the process by way of the process out-feed; and operating the buffer fluid pump repeatedly:

in the low-pressure cycle, to reciprocate the pistons in the fluid feed pump and fluid discharge pump under the relatively low supply pressure of unprocessed process fluid filling the process fluid section of the fluid feed pump and to discharge the processed process fluid from the process fluid section of the fluid discharge pump to the discharge facility; and in the high-pressure cycle, to reciprocate the pistons in the fluid feed pump and fluid discharge pump under the relatively high process pressure of processed process fluid filling the process fluid section of the fluid discharge pump and to feed the unprocessed process fluid in the process fluid section of the fluid feed pump by way of the process in-feed to the process under process pressure.

The method may conveniently include the steps of feeding the unprocessed process fluid from a fluid supply assembly comprising at least two pumps and driving the pumps in a predetermined ratio to mix and feed the unprocessed process fluid in an equivalent ratio.

In the transition between high- and low pressure cycles, the pumps and valves may conveniently be operated such that the pressure across the pump pistons and valves is substantially equal at all times.

The invention is described with reference to positive displacement reciprocating piston pumps, but it will be appreciated that the scope of the invention is not limited to such pumps and alternative and mechanically equivalent pumps may be substituted for the piston pumps described in this specification where the context permits.

In addition, the terms "piston", "cylinder" and "reciprocal" are normally intended to refer to positive displacement reciprocating piston pumps. It will be appreciated that numerous mechanical equivalents exist for such apparatus, such as rotary pumps and their components. Where the context permits, these mechanical equivalents are intended to be included.

BRIEF DESCRIPTION OF THE DRAWINGS

The invention will be further described with reference to the accompanying drawings in which:

FIG. 3 is a process flow diagram illustrating a first embodiment of a process plant including the high pressure feed and discharge apparatus of the invention;

DESCRIPTION OF EMBODIMENTS OF THE INVENTION

The invention is illustrated and exemplified with reference to supercritical fluid processing plant and particularly supercritical water used oil treatment plant. It will be appreciated that this is done purely for illustrative purposes and is not intended to limit the invention or any part thereof to such plant or equipment.

Figure 1:
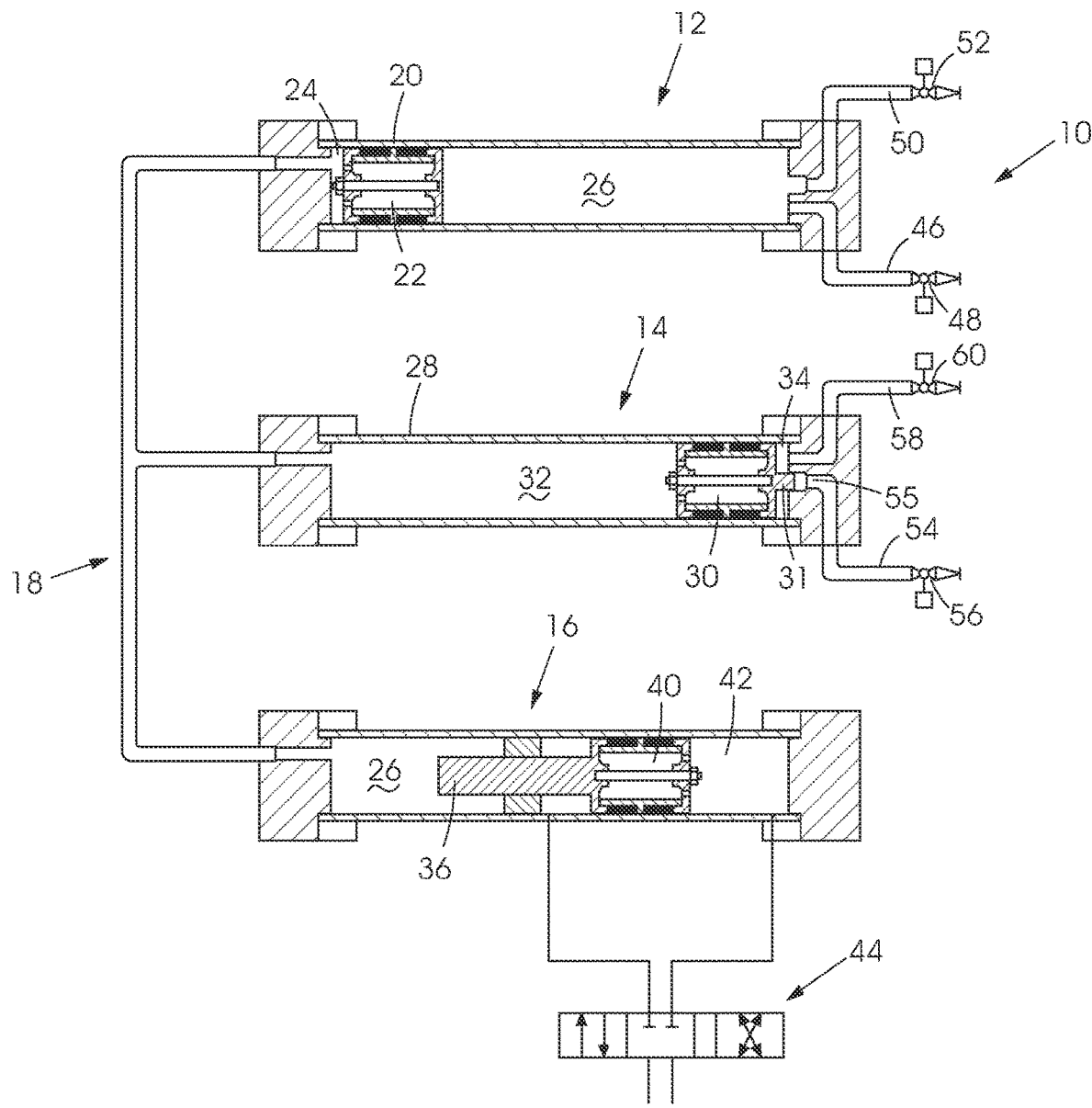
FIG. 1 is a diagrammatic representation of a pump bank constituting the apparatus basic to the high pressure feed and discharge apparatus of the invention.

A supercritical fluid is any fluid that is heated and pressurised to a temperature and pressure above its critical point, where liquid and gas phases become indistinguishable. The fluid effuses through solids like a gas and dissolves materials like a liquid. Supercritical fluids are used as a substitute for organic solvents in a range of industrial and laboratory processes. Supercritical fluids have solvent powers similar to liquids but the viscosity of the supercritical fluid is substantially lower than the parent fluid while the supercritical fluid density is many times greater than the parent fluid vapour phase at room temperature. Consequently molecular interactions occur at a much faster kinetic rate. The unprocessed process fluid or feed fluid (the fluid fed into the supercritical process for treatment) is typically a blend of feedstock and solvent fluids, the feedstock fluid being the solute. The supercritical process is normally operated to produce a process fluid that is prepared and readily capable of post-processing to extract product and waste streams The basic apparatus of the invention, as illustrated in FIGS. 1 and 2, consists of a bank of positive displacement piston pumps that constitute feed and discharge pumps. The pumps are connected to one another by means of a buffer fluid system that uses a positive displacement plunger pump as a modulating hydraulic control.

Referring to FIG. 1, the bank 10 of pumps comprises: a positive displacement piston pump configured to operate as a fluid feed pump 12; a positive displacement piston pump 14 configured to operate as a product fluid discharge pump; and a buffer fluid system (hereinafter buffer fluid system 16, 18) including a plunger pump configured to operate as a buffer fluid pump 16 (also referred to herein as buffer pump 16) that is in fluid communication with the pumps 12, 14 by way of buffer fluid lines 18 (also referred to herein as buffer fluid circuitry 18, a buffer fluid circuit 18, or simply circuitry 18) that are open (not valve controlled) to the feed and discharge pumps 12, 14, the buffer pump 16 and buffer fluid lines/circuitry 18 constituting a modulating hydraulic control mechanism for the pumps 12, 14.

The feed pump 12 comprises a feed cylinder 20 within which a free piston 22 is mounted for reciprocating movement between the ends of the feed cylinder 20. The feed cylinder piston 22 divides the feed cylinder 20 into a buffer fluid section 24 and a process fluid section 26.

The product fluid discharge pump 14 comprises a discharge or product cylinder 28 within which a free piston 30 is mounted for reciprocating motion between the ends of the cylinder 28, the piston 30 separating the cylinder 28 into a buffer fluid section 32 and a process fluid section 34.

The buffer fluid system 16, 18 (made up by the buffer fluid pump 16 and buffer fluid lines 18) is open only to the buffer fluid sections 24, 32 of the feed and discharge pumps 12, 14.

The buffer pump 16 comprises a plunger pump made up of a plunger 36 mounted for reciprocating motion within a buffer fluid cylinder 38, the plunger being acted upon by a free piston 40 reciprocally mounted within a hydraulic control cylinder 42, the operation of which is controlled by a set of modulating valves 44.

The process fluid section 26 of the feed pump 12 is provided with process fluid inlet line 46 controlled by means of a control valve 48, the inlet line 46 being connected to a supply of feed fluid under relatively low pressure (not shown in FIG. 1). The process fluid section 26 is provided with a process fluid outlet line 50 controlled by a valve 52, by means of which feed fluid is supplied to a process under relatively high process pressure (the process not being shown in FIG. 1). The outlet constitutes a process in-feed by means of which product fluid is fed to the process.

The process fluid section 34 of the discharge pump 14 is provided with a process fluid inlet line 54 controlled by a valve 56 by means of which the product fluid is fed from a process out-feed (not shown).

The process out-feed is the feed of product fluid that, after processing, is fed under process pressure from the high pressure process to the fluid discharge pump 14.

The terms "in" and "out" in the terms "process in-feed" and "process out-feed" refer, respectively, to a feed into and out of the process, regardless of the flow direction of the process fluid into or out of a pump 12, 14.

The pump 14 is provided with a process fluid outlet line 58 controlled by a valve 60 by means of which the product fluid in the fluid discharge pump 14 is discharged under relatively low pressure to a product fluid store (not shown).

The feed and discharge cylinders 20, 28 are sealed except for the inlet and outlet lines 46, 50, 54, 58 and the pistons 22, 30 in each cylinder are hydraulically connected by the buffer fluid in the buffer fluid system 16, 18 which provides a hydraulic link between the feed and discharge pumps 12, 14.

The operation of the apparatus is illustrated in FIGS. 2A to 2K.

Figure 2A:
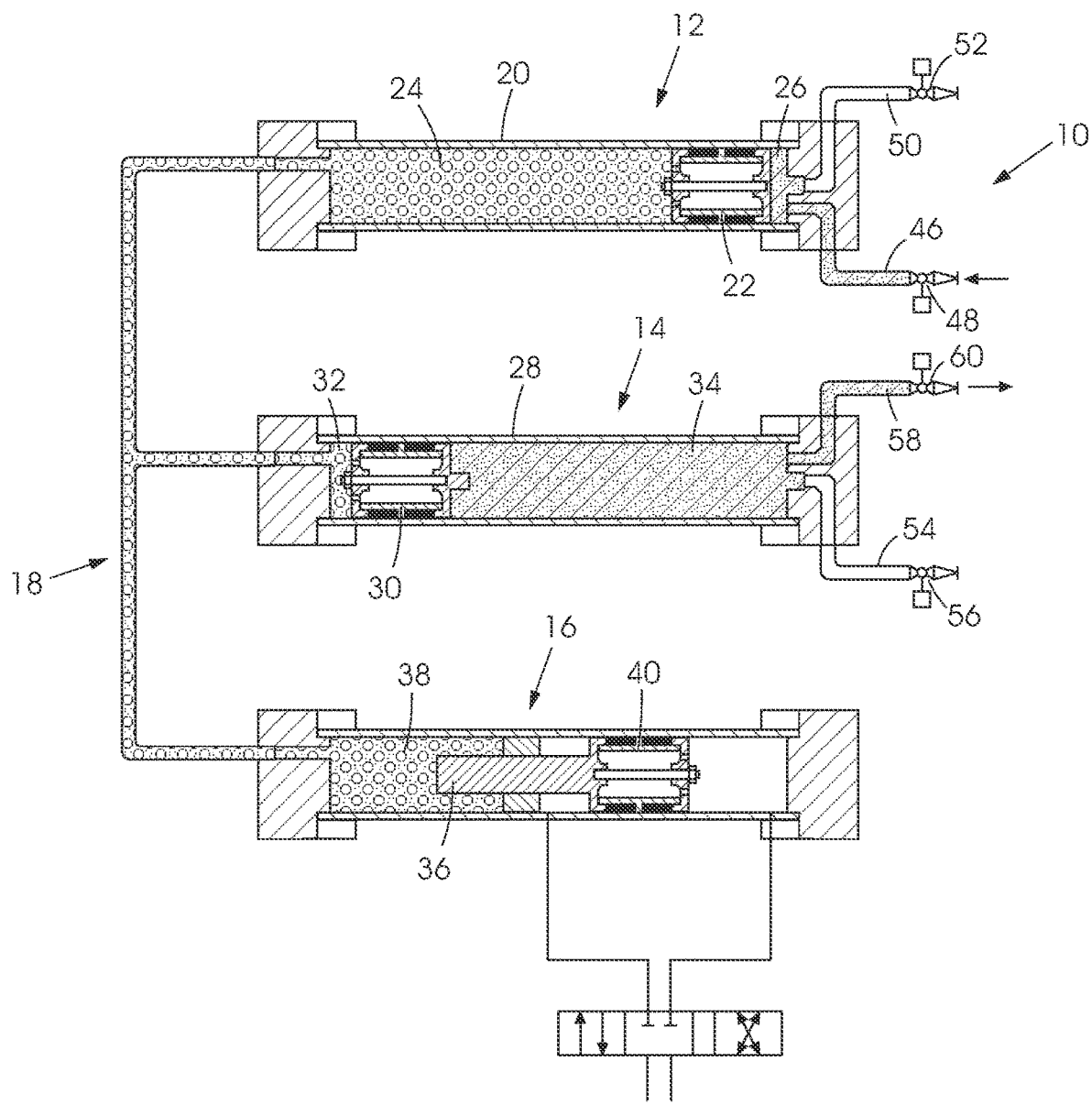
FIG. 2 is a series of similar diagrams illustrating (in FIGS. 2A to 2K) the manner in which the basic apparatus of FIG. 1 operates.

In FIG. 2A, the bank of pumps 10 is illustrated at the beginning of the discharge cycle, with the discharge pump 14 filled with product fluid previously supplied from the process. The discharge pump inlet valve 56 is closed, thereby isolating the discharge pump 14 from high process pressure. The process fluid section 26 of the feed pump 12 is essentially empty and the outlet valve 52 is closed, thereby isolating the feed pump 12 from process pressure. Buffer fluid within the buffer fluid system 16, 18 equalizes pressures within the buffer fluid sections 24, 32 of the pumps 12, 14 and balances the fluid pressure within the entire bank 10, which, in this state, is relatively low since the pumps 12, 14 are isolated from process pressure by virtue of the valves 52, 56 being closed.

Figure 2B:
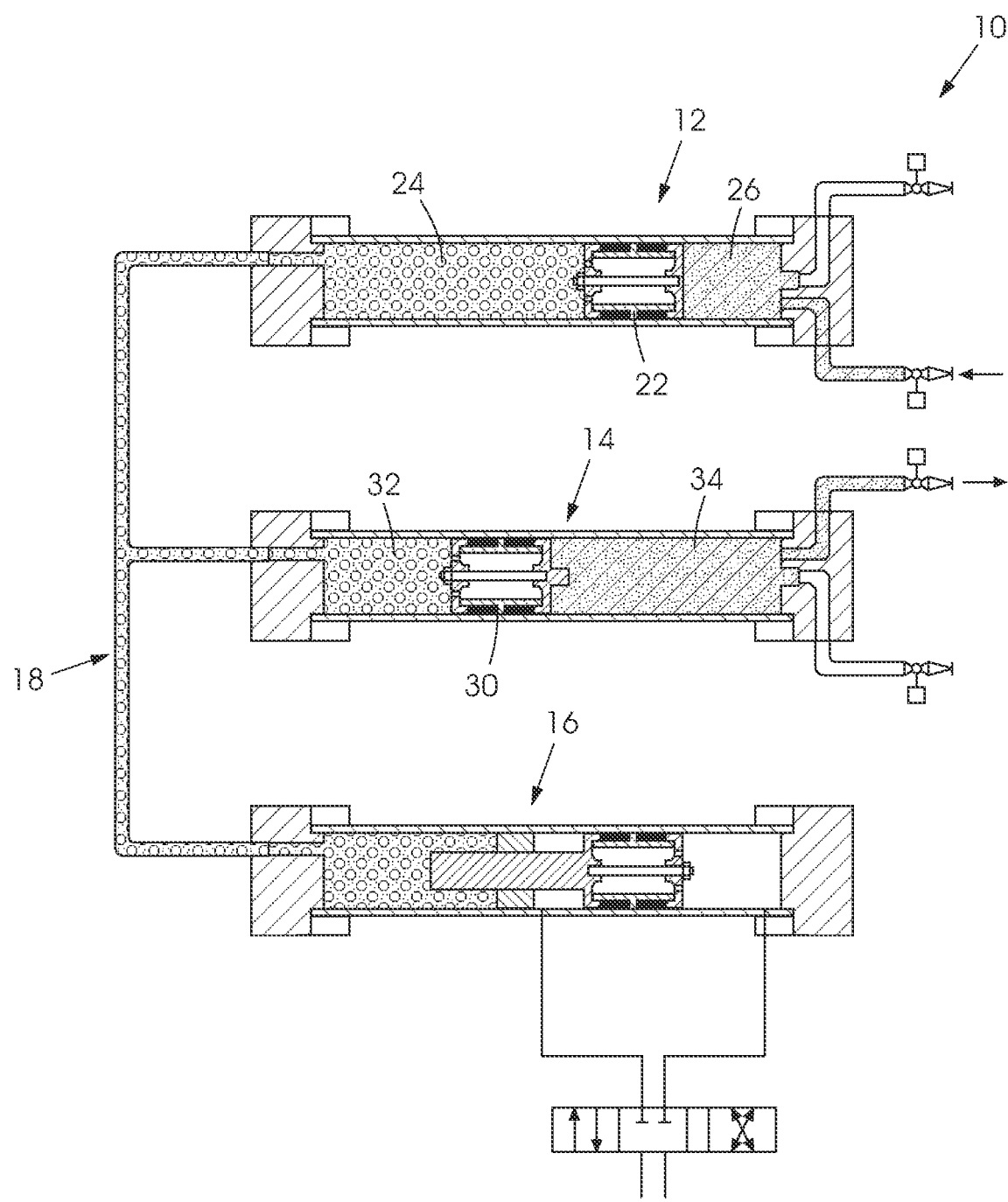
Figure 2C:
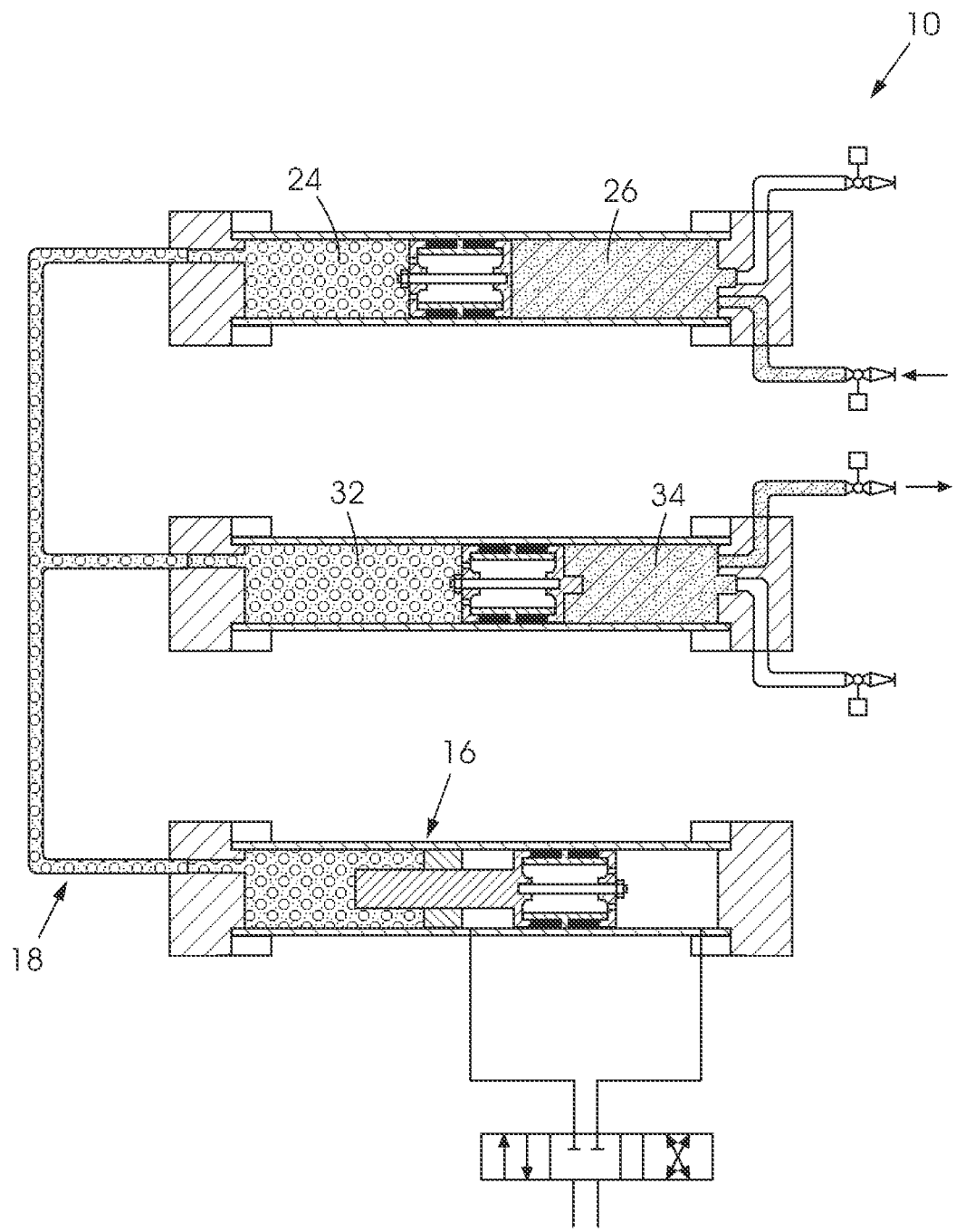

Moving from FIG. 2A through FIGS. 2B and 2C, feed fluid is supplied to the process fluid section 26 of the feed pump 12 by means of a low pressure feed pump (not shown). The resulting pressure differential between the process fluid section 26 of the feed pump and the process fluid section 34 of the discharge pump 14 causes the feed pump piston 22 to reciprocate automatically to allow the process fluid section 26 to fill up with feed fluid.

Due to the hydraulic linkage provided by the buffer fluid system 16, 18, the feed pump piston 30 is reciprocated in the opposite direction to discharge the product fluid in the process fluid section 34 by way of the outlet 58 and open valve 60 to the product fluid store (not shown).

Figure 2D:
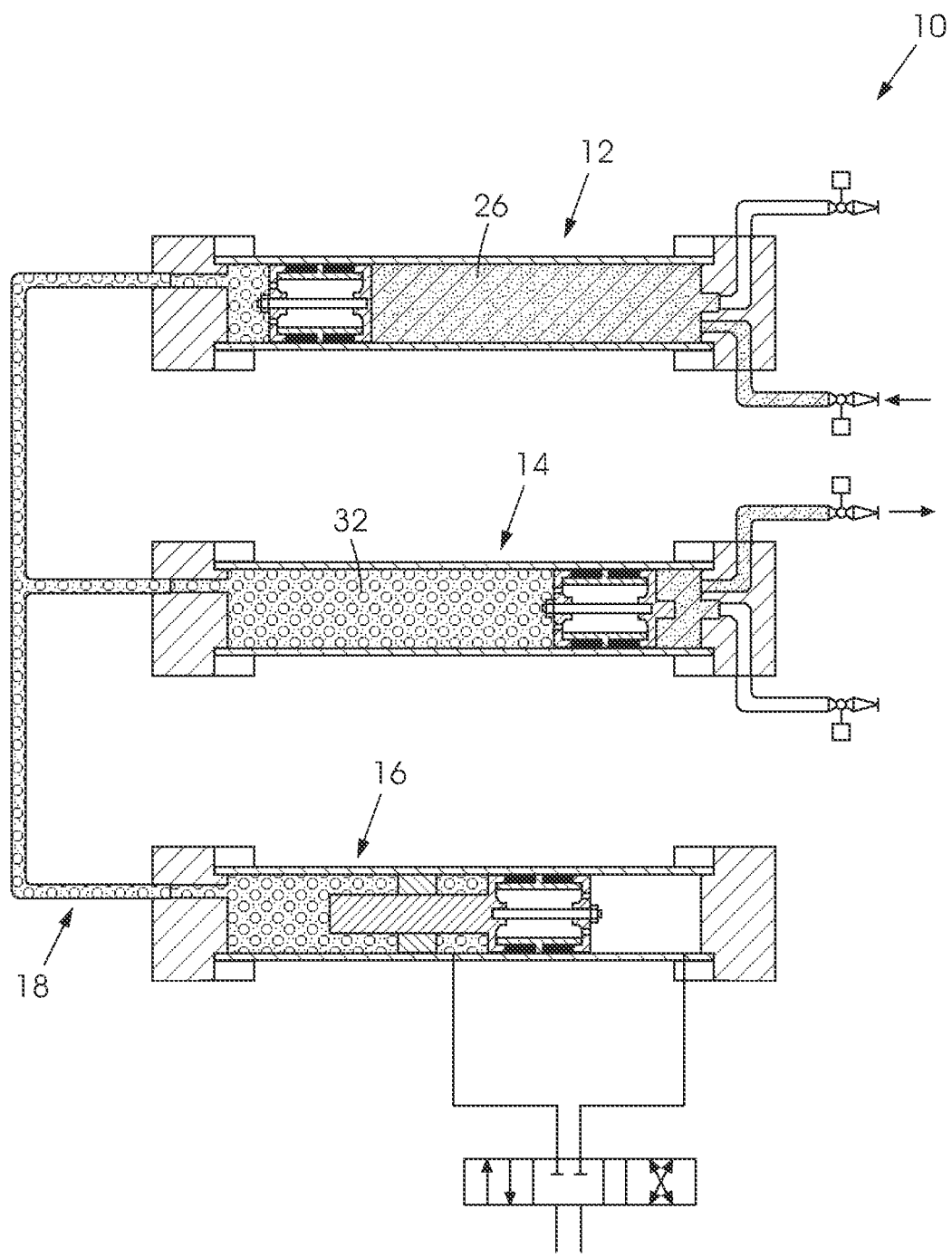

The reciprocation of the pistons 22, 30 continues through the positions illustrated in FIG. 2C to the position illustrated in FIG. 2D in which the product fluid section 34 of the discharge pump 14 is essentially empty and the feed fluid section 26 of the feed pump 12 is essentially full.

Throughout this discharge cycle (FIGS. 2A to 2D), the fluid pressure within the bank 10 of pumps remains relatively low. The discharge pressure is also relatively low and discharge turbulence is kept to a minimum.

At this point, the bank 10 of pumps cycles from discharge mode (FIGS. 2A to 2D) to charge mode (FIGS. 2E to 2I).

Figure 2E:
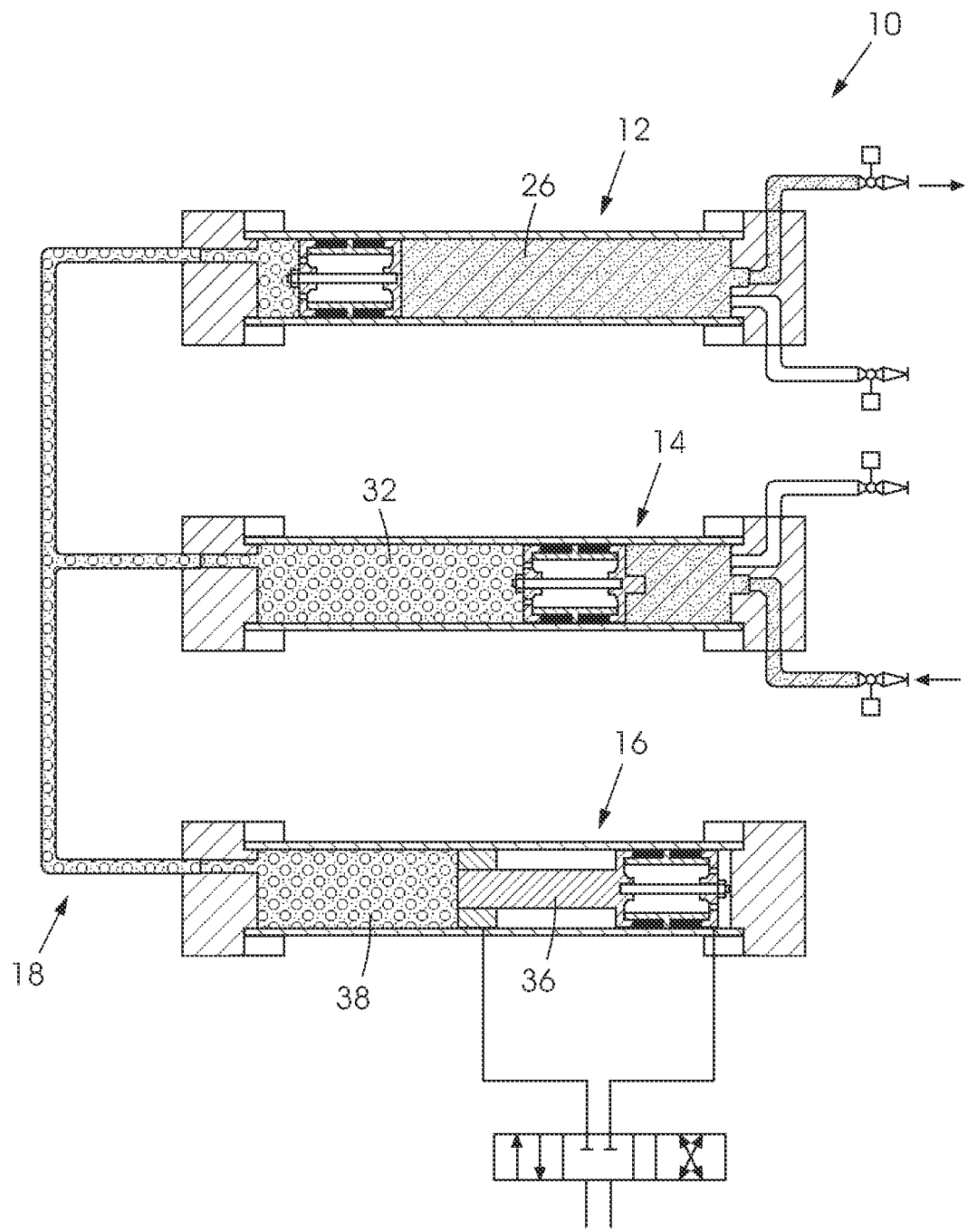
Figure 2F:
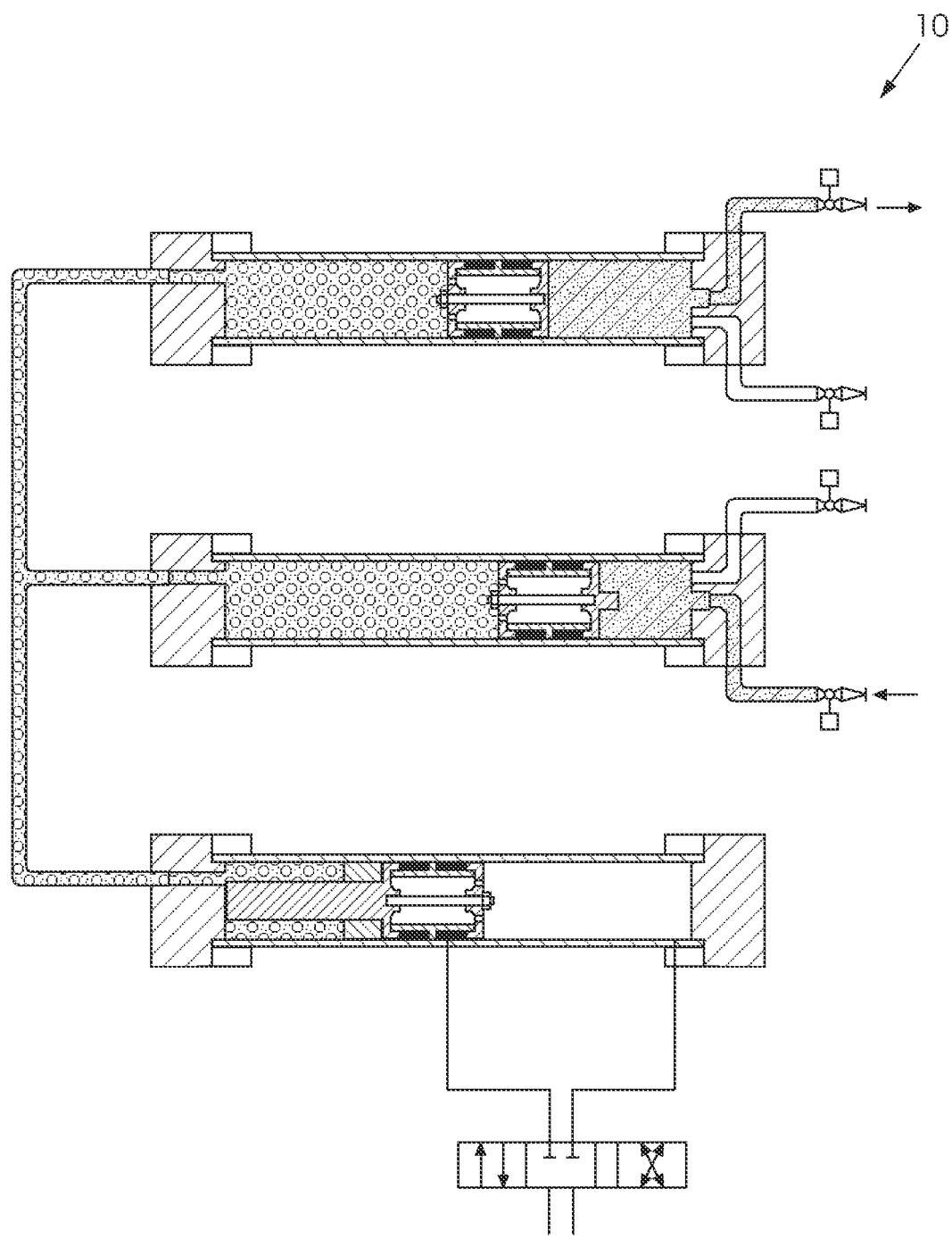
Figure 2G:
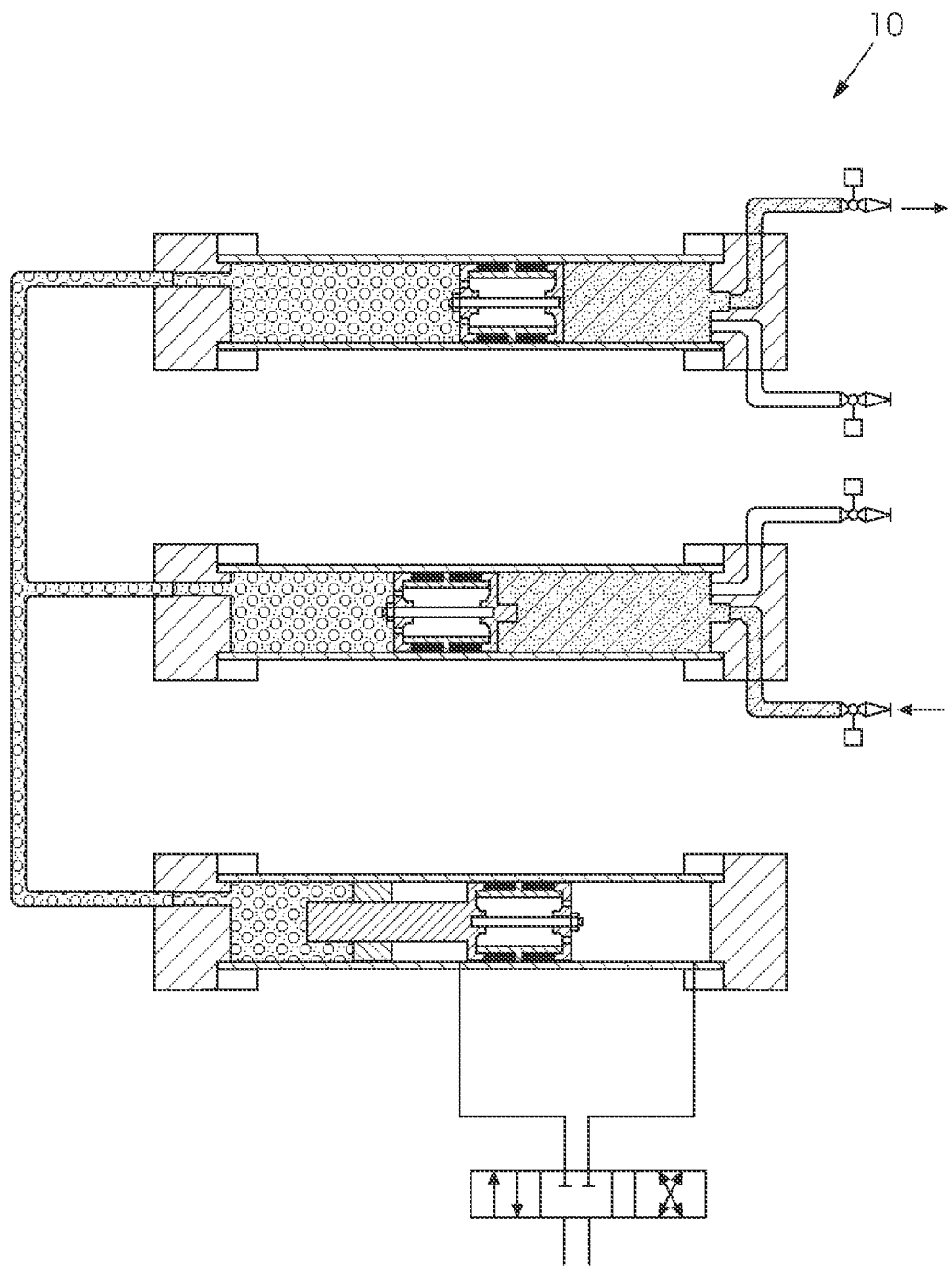
Figure 2H:
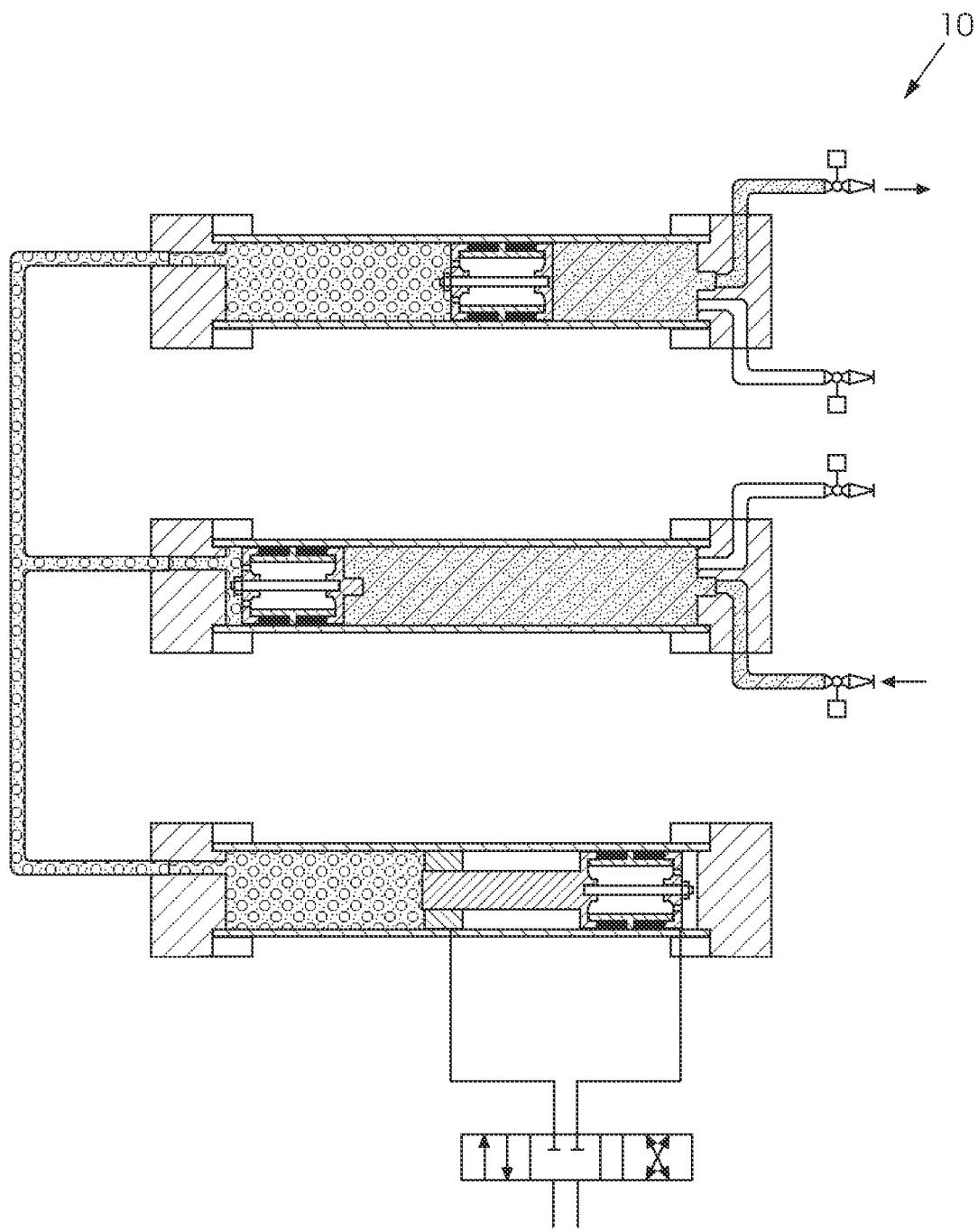
Figure 2I:
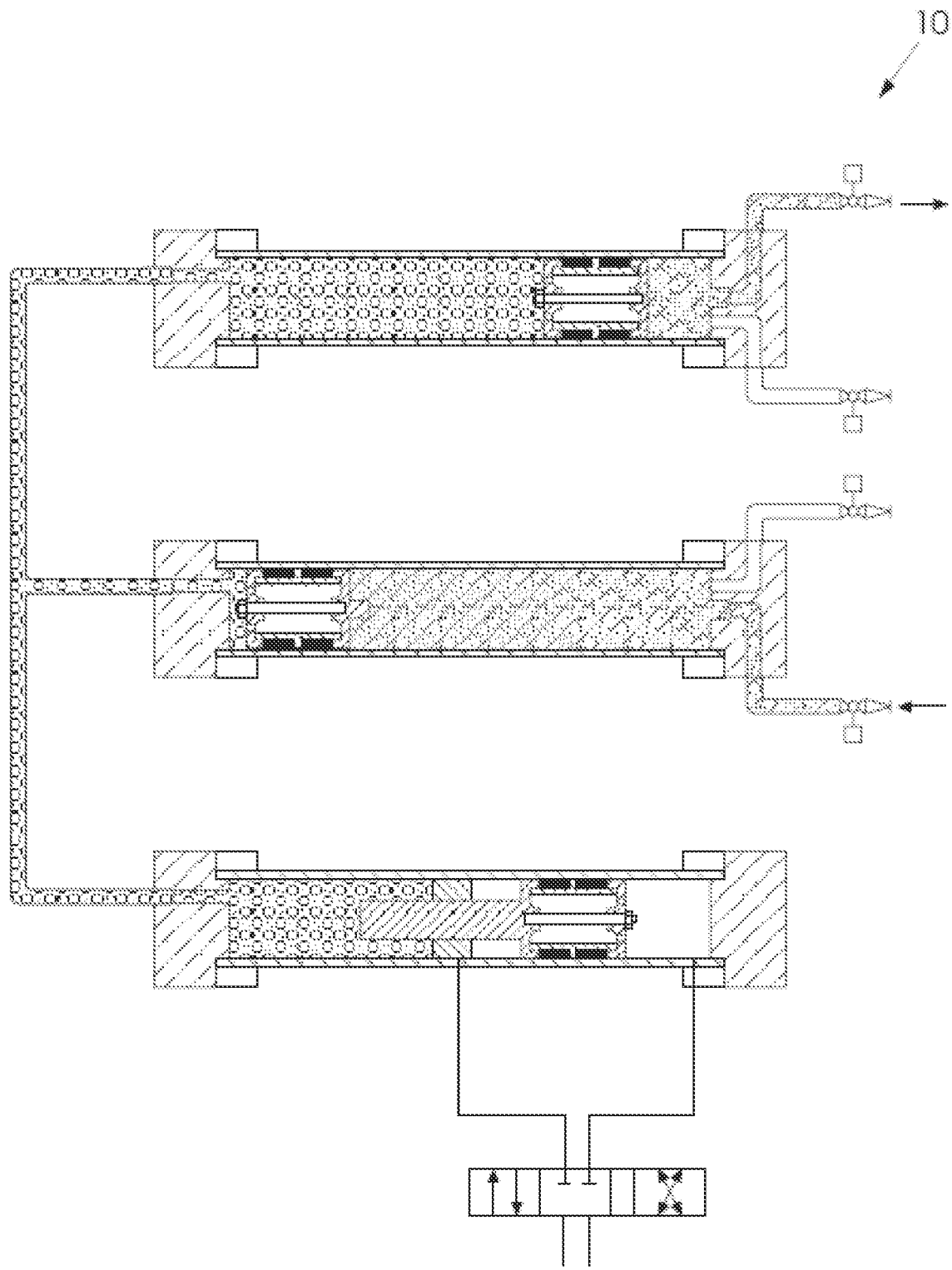

In FIG. 2E, the feed pump inlet valve 48 is closed and the outlet valve 52 is opened, exposing the process fluid section 26 of the feed pump 12 (which is filled with product fluid) to process pressure. At the same time, the discharge pump outlet valve 60 is closed while the inlet valve 56 is opened, exposing the process fluid section 34 of the discharge pump 14 to process pressure. As a result, the pressure in the bank 10 of pumps 12, 14 rises to the process pressure. With the pressure in the pumps 12, 14 essentially balanced, the buffer plunger 36 is withdrawn, thereby allowing product fluid flowing in through the inlet valve 56 to charge the process fluid section 34 of the feed pump 14, a process that continues through the stages illustrated in FIGS. 2F, 2G and 2H up to the end of the charge cycle illustrated in FIG. 2I. During this time, the plunger 36 in the buffer cylinder 38 oscillates to modulate system pressure within the bank 10 of pumps.

Figure 2J:
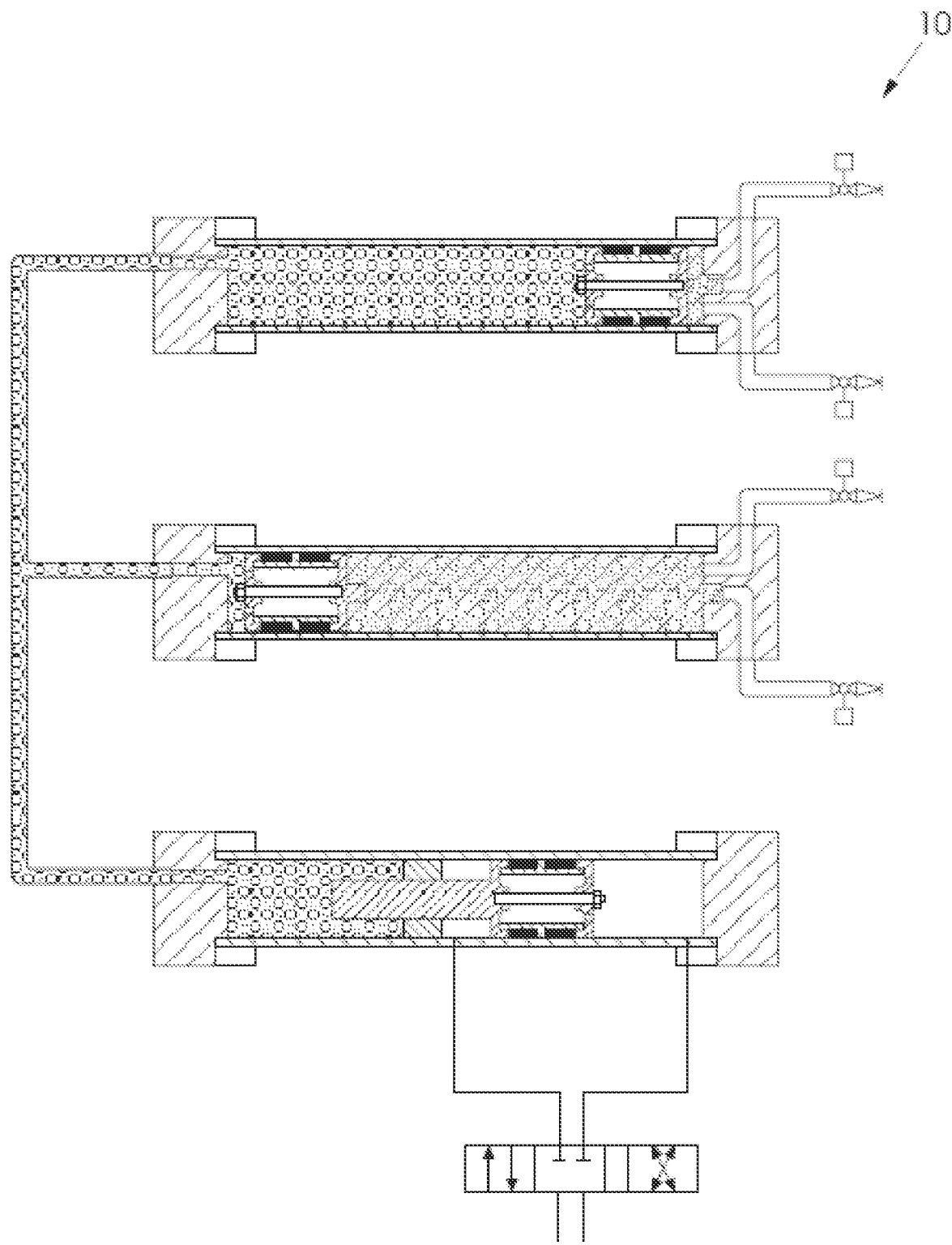
Figure 2K:
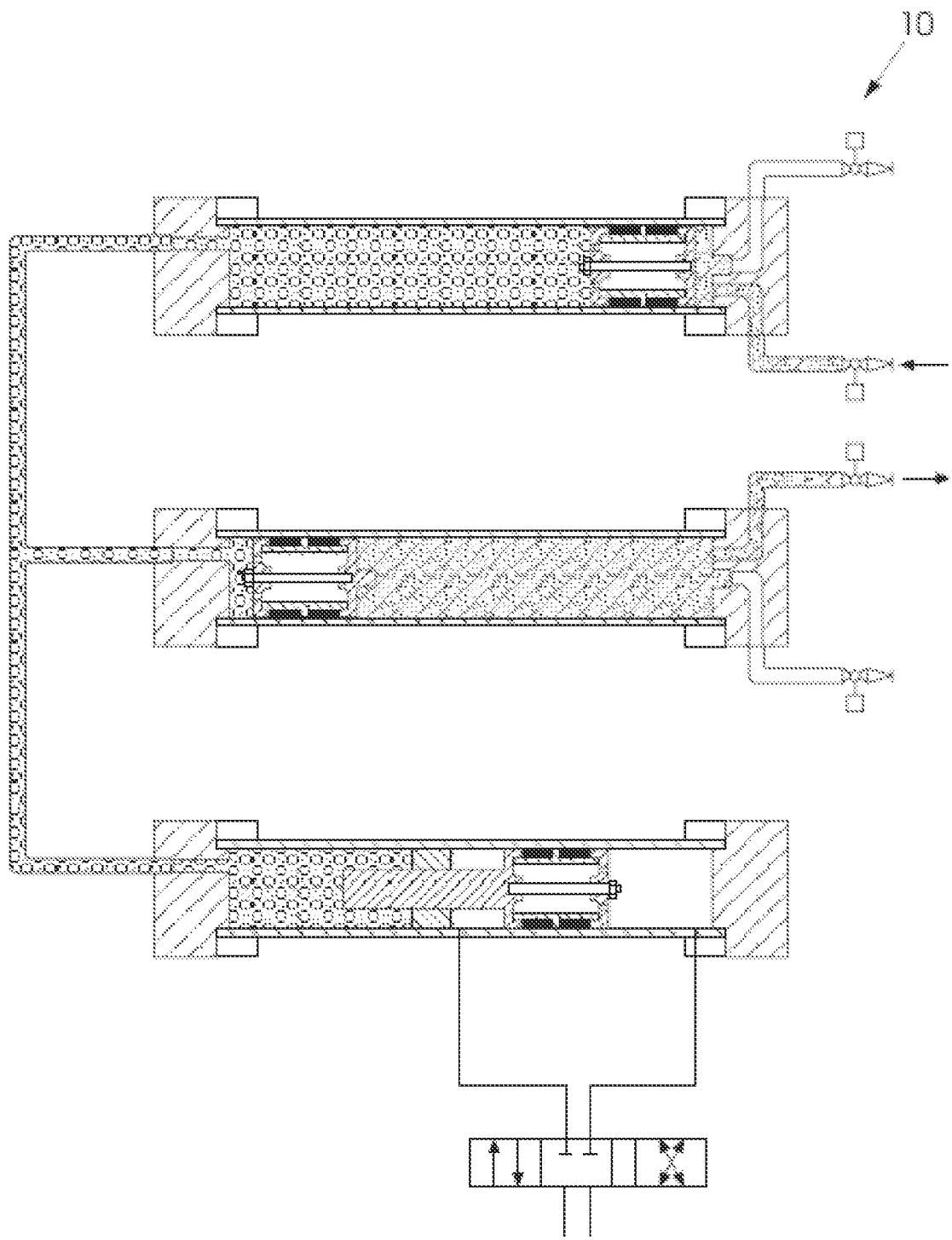

As the bank 10 of pumps reaches the end of the charge cycle (FIG. 2I), all the valves (48, 52, 58, 60) close (as illustrated in FIG. 2J) to isolate the feed and discharge pumps 12, 14 from process pressure and the buffer cylinder plunger 36 is withdrawn to reduce pressure prior to opening the discharge valves as illustrated in FIG. 2K, which brings the bank 10 of pumps back to the state illustrated in FIG. 2A ready to commence the discharge cycle described above with reference to FIGS. 2A to 2D.

In a typical implementation, the apparatus of the invention will have at least two banks of cylinders to smooth out the flow to and from the high pressure process.

Such an implementation is illustrated in FIG. 3 in which a first bank 10.1 of pumps is interconnected with a second bank 10.2 of pumps. The banks 10.1, 10.2 of pumps are supplied with feed fluid from a set of low pressure feed pumps 62. The high pressure process is performed in a reactor 64 and the product fluid is discharged into a process fluid discharge facility including a product/processed fluid store 66.

The buffer fluid lines 18.1, 18.2 of the pump banks 10.1, 10.2 are provided with cooling coils 68 by means of which the buffer fluid can be cooled if necessary. The interiors of the pistons 22, 30 in the feed and discharge cylinders 20, 28 of the pump banks 10.1, 10.2 are open to the buffer fluid in the buffer fluid sections 24, 32 to allow the ingress of cooled buffer fluid if cooling should become necessary to preserve the piston seals.

In the state illustrated in FIG. 3, the valves of the pump banks 10.1, 10.2 are set to ensure that the pumps of the one bank 10.1 will discharge when the pumps of the other bank 10.2 are charging and vice versa, thereby ensuring essentially continuous flow.

In reactor charge mode, the cylinders are under reactor process pressure, but the differential pressure across the feed and discharge pistons 22, 30 equates substantially to the pressure drop across the reactor system. In most implementations, this pressure drop will be relatively small, thereby ensuring automatically that the piston seals have little pressure to resist.

Referring to FIG. 1, the product pumps 14 include a mini-piston 31 configured to penetrate and occlude an enlarged mini-cylinder 55 formed about the opening of the product fluid inlet line 54. When the discharge piston 30 reaches the end of its piston stroke in the process fluid section 34, the mini-piston 31 enters the mini-cylinder 55, which raises the back pressure in front of the product fluid inlet valve 56, thereby allowing the valve 56 to open with a reduced pressure drop across its seat.

As illustrated above, the inlet valves 56 to the discharge pumps 14 shut at the end of the charge stroke whilst the outlet valve 60 remains closed. The buffer cylinder plunger 36 then withdraws fractionally, thereby reducing the pressure in the discharge cylinder 28. Once the pressure in the discharge cylinder 28 has reduced, the outlet valve 60 to the product/processed fluid store 66 has no differential pressure across the valve as it opens. In this manner, the discharge cycle allows the product fluid to be transferred to the product/processed fluid store 66 with minimal turbulence.

Figure 4:
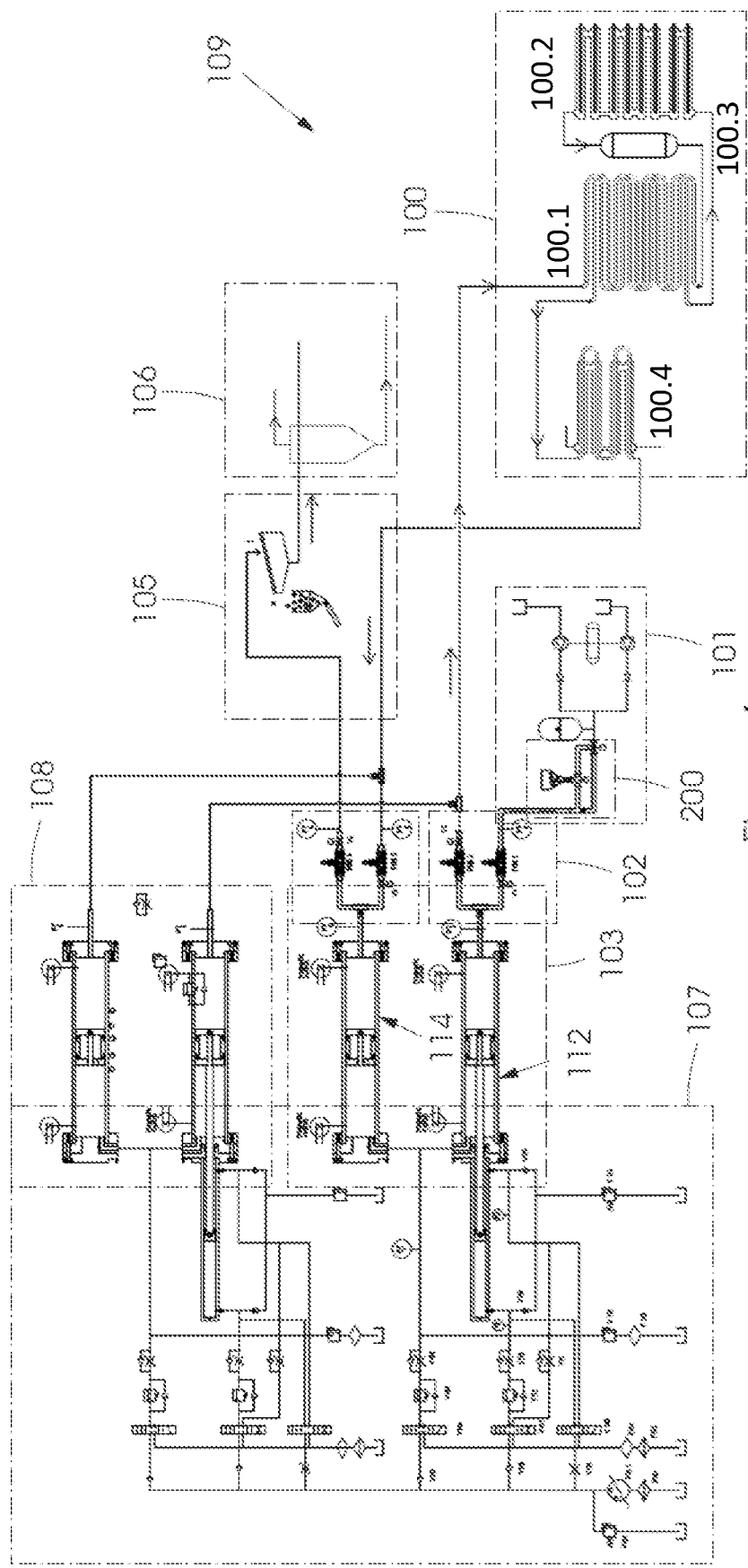
FIG. 4 is a process flow diagram illustrating a second embodiment of a process plant including the high pressure feed and discharge apparatus of the invention.
Figure 5:
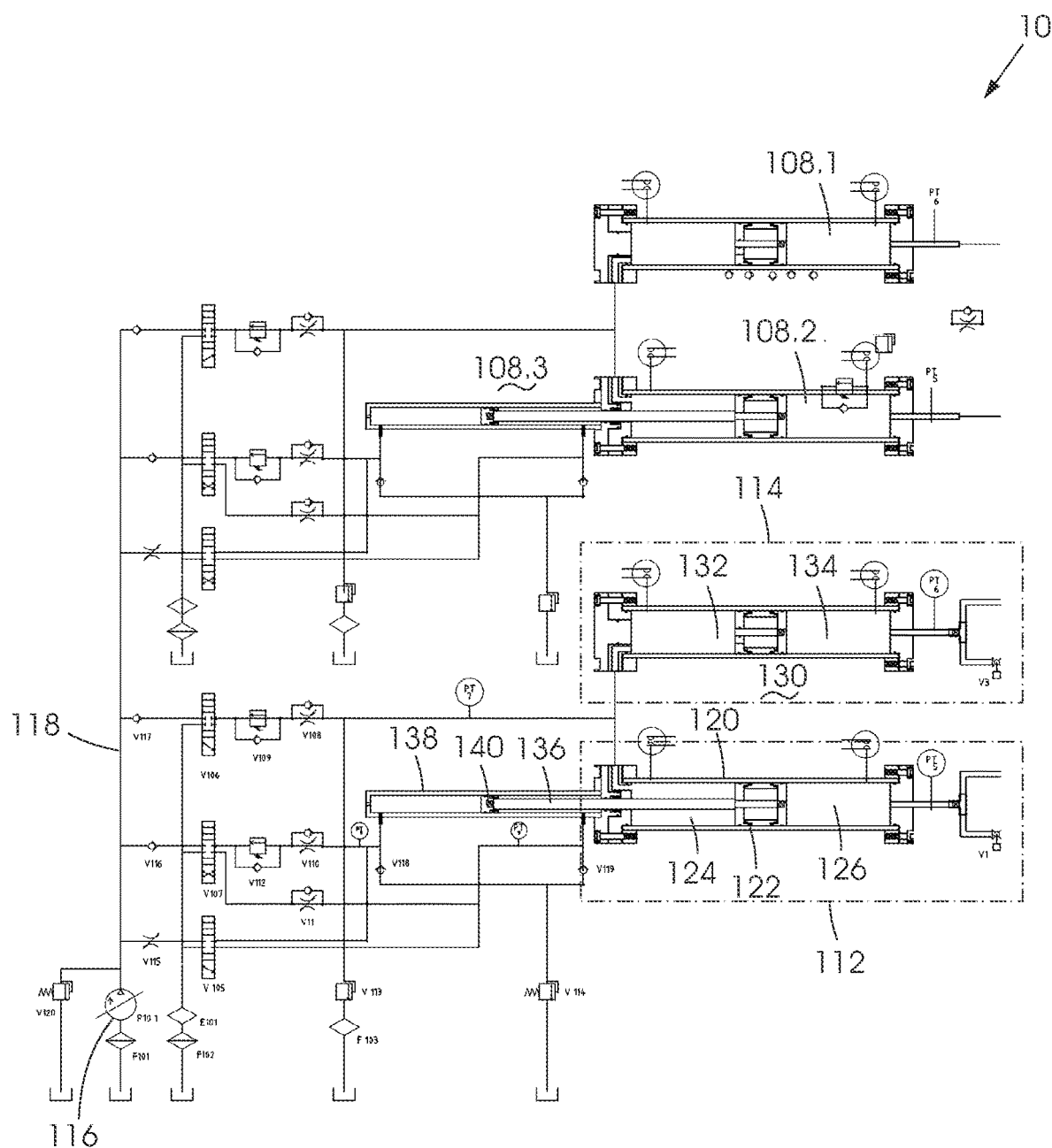
FIG. 5 is a portion of the process flow diagram of FIG. 4 illustrating the primary and auxiliary pump assemblies forming part of the plant of FIG. 4 in more detail.
Figure 6:
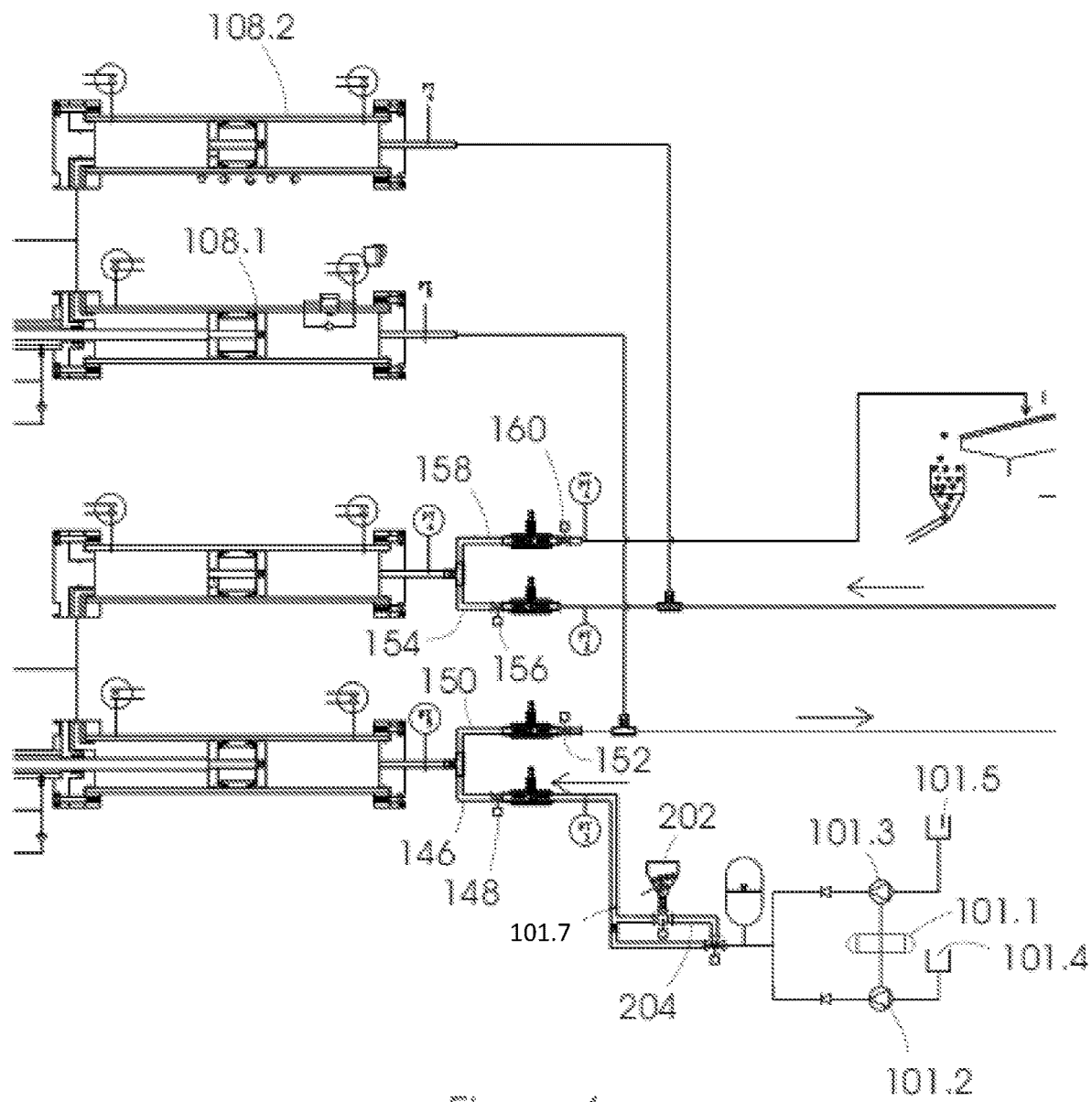
FIG. 6 is a portion of the process flow diagram of FIG. 4 illustrating the primary pump and in-feed assemblies in more detail.
Figure 7:
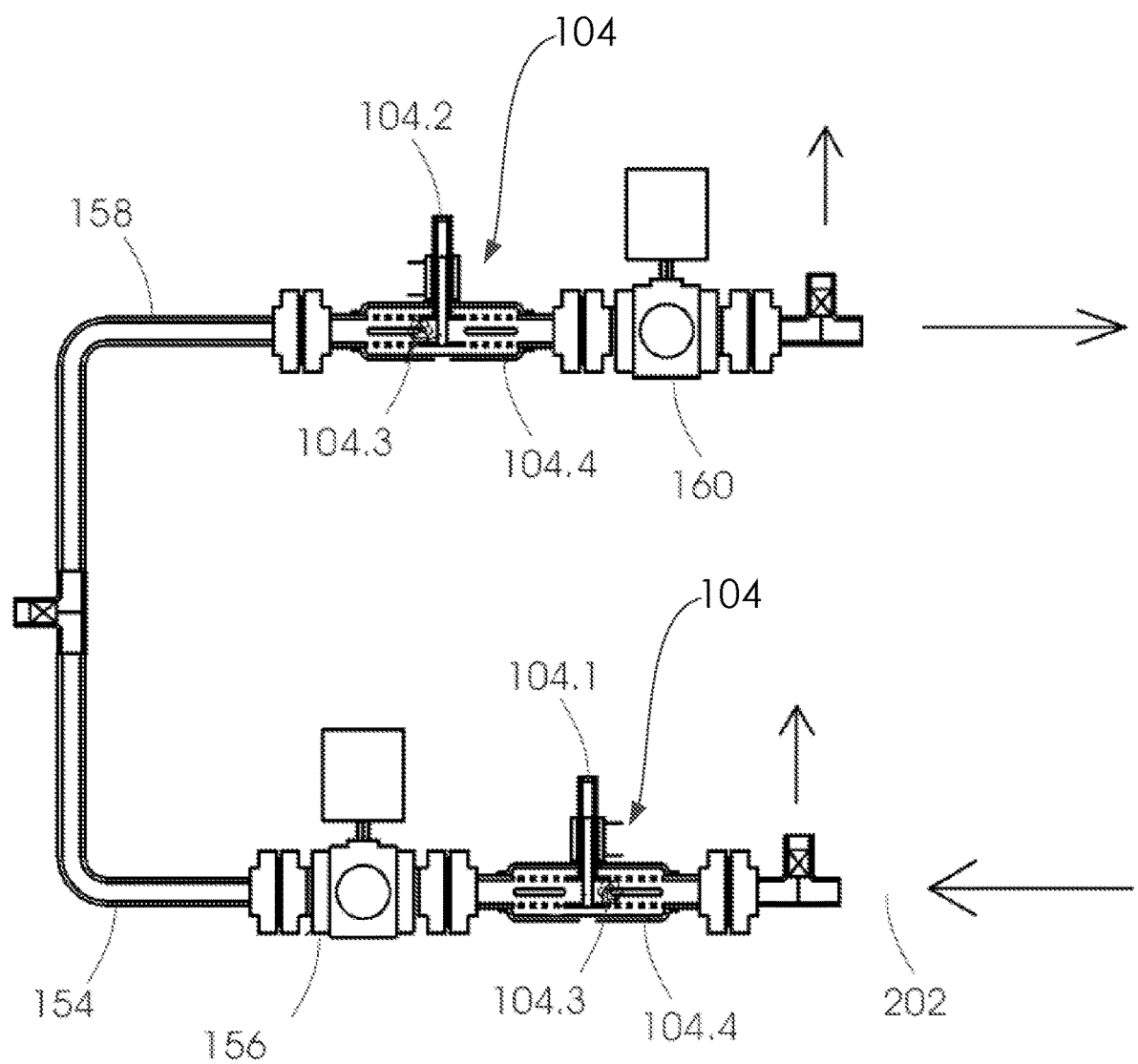
FIG. 7 is a portion of the process flow diagram of FIG. 4 illustrating the pipe cleaning pig handling apparatus forming part of the plant in more detail.

A second embodiment of the invention (essentially a development of the plant of FIG. 3) is illustrated in FIGS. 4 to 6 which show a plant made up of a plurality of functional process assemblies, including:
 a reactor assembly 100;
 a feed fluid supply assembly 101;
 a feed cylinder pig holdback assembly 102;
 a primary pump assembly 103;
 a production cylinder pig holdback assembly 104;
 a pig recovery station 105;
 a product storage assembly 106;
 an auxiliary pump assembly 107 which is equivalent to and takes the place of the buffer system and buffer pump of FIGS. 1 to 3; and
 an accumulator pump assembly 108;
 which, together, make up a process plant 109.

In FIGS. 4 to 6, like elements found in both embodiments of the invention (FIGS. 1 to 3 and FIGS. 4 to 6) are given similar numbering, but then with the second embodiment elements (illustrated in FIGS. 4 to 6) numbered in 100s. For instance the FIG. 6 equivalent of the FIG. 1 feed pump 12 is the FIG. 6 feed pump 112.

The plant 109 is a process plant for the treatment of used lubrication oil using supercritical water, the solute being used fuel oil and the solvent being supercritical water.

The two fluids (used oil and water) are pumped into the process by means of the feed fluid supply assembly 101 in which a motor 101.1 drives a pair of pumps 101.2, 101.3 in a predetermined ratio to mix and feed the feedstock and solvent fluids from supply tanks 101.4 and 101.5 respectively. The feed fluid supply assembly 101 raises the feed fluid pressure to a predetermined fluid supply pressure (approximately 600 kPa in the used fuel oil example). An accumulator 101.6 is used to regulate and maintain the feed fluid supply pressure. Additional chemicals and catalysts may be dosed into the feed fluid mixture.

The primary pump assembly 103 raises the feed fluid (and therefore the process fluid) pressure to a predetermined process pressure that is substantially greater than the fluid supply pressure (produced by the feed fluid supply assembly 101). In the used fuel oil treatment process plant 109, the primary pump assembly 103 increases the pressure of the feed fluid (the feedstock/water mixture) to anything from 22 mPa to 25 MPa. At this point, the pressure of the mixture must be higher than the supercritical pressure of water, which is approximately 22 mPa at 420° C. In the preferred form of the invention, in use as a used fuel oil treatment process plant 109, the primary pump assembly 103 increases the pressure of the feed fluid (the feedstock/water mixture) to 24 MPa.

The reactor assembly 100 illustrated in FIG. 1 comprises a countercurrent heat exchanger 100.1, the input side of which is operated as a pinch heater, an electrical resistance heater 100.2 a contact tower 110.3 and a water cooled heat exchanger 100.4.

Together, the two heaters 100.1, 100.2 raise the temperature of the process fluid (the feed fluid fed to the contact tower 100.3) to a predetermined process temperature. In the preferred form of the invention, in use as a used fuel oil treatment process plant 109, the process fluid temperature is raised to between 375° C. and 440° C. and the process fluid pressure is kept at around 24 MPa.

The contact tower 100.3 is operated as a supercritical reactor.

The product fluid exits the reactor 100.3 as a multi-phase liquid (essentially a two-phase fluid with readily separable fractions). Whilst the phases or fractions are substantially immiscible, it will be appreciated that excessive turbulence in the exit stream will remix the product fluid to a greater or lesser degree which will cause commensurate complication in subsequent separation of the product fluid. The apparatus and processes downstream of the reactor 100.3 are therefore configured to minimise turbulence and to keep process flows as non-turbulent as possible.

After processing in the reactor 100.3, the product fluid (or product) is fed to the countercurrent section of the countercurrent heat exchanger 100.1 where heat energy is recovered from the product to pre-cool the product and pre-heat the incoming feed fluid.

After pre-cooling, the product is fed to the water cooled heat exchanger 100.4.

Process fluid circulation in the process plant 109 takes place within fluid lines (process fluid inlet and outlet lines 146, 150, 154, 158) similar to the process fluid inlet and outlet lines 46, 50, 54, 58 described with reference to FIGS. 1 to 3. Process fluid circulation is driven by the primary pump assembly 103, which is a bank 110 of positive displacement piston pumps 112, 114 similar to the pumps 12, 14 described with reference to FIGS. 1 to 3. The pumps 112, 114 are configured to operate as a feed fluid (process/feed fluid) pump 112 and a product (process/product fluid) discharge pump 114 respectively. The process fluid inlet and outlet lines 146, 150 connect the feed fluid pump 112, respectively, to the feed fluid supply assembly 101 and the reactor assembly 100. The process fluid inlet and outlet lines 154, 158, connect the discharge pump 115, respectively, to the reactor assembly 100 and the product storage assembly 106.

Fluid pressure in the primary pump assembly 103 is adjusted by means of a plunger pump configured to operate as a buffer pump 116. This pump 116 and its associated control- and reticulation circuitry or piping constitutes a modulating hydraulic control similar to the buffer fluid system 16, 18 described with reference to FIGS. 1 to 3).

The feed pump 112 comprises a feed cylinder 120 within which an essentially free piston 122 is mounted for reciprocating movement between the ends of the feed cylinder 120. The feed cylinder piston 122 divides the feed cylinder 120 into a buffer fluid section 124 and a feed fluid section 126.

The product fluid discharge pump 114 comprises a discharge or product cylinder 128 within which a free piston 130 is mounted for reciprocating motion between the ends of the cylinder 128, the discharge cylinder piston 130 separating the cylinder 128 into a buffer fluid section 132 and a product (product fluid) section 134.

The buffer fluid system includes the buffer fluid pump 116 and connecting buffer fluid lines 118 (and is thus referred to herein as buffer fluid system 116, 118) and is open only to the buffer fluid sections 124, 132 of the feed and discharge pumps 112, 114. The buffer pump 116 comprises a plunger pump made up of a plunger 136 mounted for reciprocating motion within a buffer fluid cylinder 138, the plunger being acted upon by a piston 140 reciprocally mounted within the buffer fluid cylinder 138, the operation of which is controlled by a set of modulating valves.

The feed fluid section 126 of the feed pump 112 is provided with a feed fluid inlet line 146 controlled by means of a control valve 148, the feed fluid inlet line 146 being connected to the feed fluid supply provided by the feed fluid supply assembly 101. The feed fluid section 126 is provided with a feed fluid outlet line 150 controlled by a valve 152 by means of which unprocessed feed fluid is supplied to the reactor assembly 100 under relatively high process pressure. The feed fluid outlet line 150 constitutes the process in-feed by means of which unprocessed feed fluid is fed to the process performed in the reactor assembly 100.

The valves 148, 152 form part of a feed cylinder pig holdback assembly 102 that is described in more detail below.

The product section 134 of the discharge pump 114 is provided with a product fluid inlet line 154 controlled by a valve 156 by means of which the product fluid is fed from the process out-feed of the reactor assembly 100 under process pressure to the fluid discharge pump 114. A product fluid outlet line 158 from the pump 14 is controlled by a valve 160 by means of which the product (product fluid) is discharged under relatively low pressure to the product storage assembly 106.

The feed and discharge cylinders 120, 128 are sealed except for the inlet and outlet lines 146, 150, 154, 158 and the pistons 122, 130 in each cylinder are hydraulically connected by the buffer fluid in the buffer fluid system 116, 118 which provides a hydraulic link between the feed and discharge pumps 112, 114.

The plant 109 includes a pipeline pig cleaning system including a pig insertion station 200, a feed cylinder pig holdback assembly 102, a production cylinder pig holdback assembly 104 and a pig recovery station 105. The pig system uses a plurality of pipeline pigs 202 that are fed into the process fluid lines 146, 150, 154, 158 of the plant 109 at the pig insertion station 200 and transported through the process fluid lines 146, 150, 154, 158 by the movement of the process fluid through the process fluid lines 146, 150, 154, 158.

At the pig insertion station 200, a solenoid-actuated feed is mounted on a valve controlled bypass line 204 that is intermittently pressurised and depressurised. The pigs 202 are fed from a pig feed hopper 206 into the bypass line 204 and from there into the feed fluid inlet line 101.7. The pig feeder comprises a solenoid operated pig holdback assembly that is operated to ensure that the pigs are held back and released intermittently to feed a single pig 202 per pump stroke into the feed fluid line 101.7. The pigs 202 must not move into the feed cylinder inlet valve 148 until this valve is fully open and fluid is flowing to the feed cylinder 112.

The pig recovery station 105 includes a catch grid 105.1 and a hopper 105.2 that collect the pigs 202 exiting the process plant 109 at the point where the processed product is discharged to the product storage assembly 106. From the pig recovery station 105 the pigs 202 are returned to the pig feed hopper 206.

The pig holdback assemblies 102, 104 are virtually identical and will be described mainly with reference to the production cylinder pig holdback assembly 104 (FIG. 4) for the sake of brevity and clarity. The pig holdback assembly 104 includes a pair of solenoid actuated holdback devices 104.1, 104.2, each mounted in-line on a fluid feed line of the plant 109 extending to/from the input/output end of the discharge cylinder 114. The solenoid actuated holdback devices of the feed cylinder pig holdback assembly 102 (FIGS. 1 and 3) are mounted in-line on a fluid feed line extending to/from the input/output end of the discharge cylinder 114.

The process fluid lines 146, 150, 154, 158 are constructed to ensure the minimum of internal projections, to ensure uninterrupted pig transport through the fluid lines. The process fluid lines 146, 150, 154, 158 are joined by means of T-pieces fitted with baffles and ratchets (not shown) that serve to deflect and direct the pigs during movement and fluid transport of the pigs 202 through the process fluid lines 146, 150, 154, 158.

The solenoid actuated holdback devices have a solenoid-controlled gate 104.3 (FIG. 4) mounted to partially occlude a bypass tube 104.4 (FIG. 4), the solenoid being actuable selectively to operate the gate 104.3 to interrupt or allow pigs through the bypass tube in dependence on the process cycle. The bypass tube 104.4 ensures that the gate 104.3 never occludes the fluid line in which it is mounted. Technically therefore, the gate 104.3 does not close the fluid line. For purposes of pig transport and movement however, the gate 104.3 does close or open the fluid line to permit or prevent the passage of the pigs 202 and in this sense the gate 104.3 is said to be "open" or "closed" respectively.

The operation of the primary pump assembly 103 is as follows—

Cycle A—the feed cylinder inlet valve 148 opens and the feed cylinder piston 122 moves from right to left (directions taken from the drawings); a single pig 202 is dropped into feed line 101.7 by means of the pig insertion station 200; the discharge cylinder outlet valve 160 opens and the discharge cylinder piston 130 moves from left to right; PHB1 is open; PHB4 is open; feed fluid flows into the feed cylinder 112 and product flows out of the discharge cylinder 114, through the pig recovery station 105 to the product storage assembly 106—buffer fluid pressure: 10 bar Cycle B—the feed cylinder piston 122 is located at the left hand end of the feed cylinder 112; the feed cylinder inlet and outlet valves 148, 152 are closed; the discharge cylinder inlet and outlet valves 156, 160 are closed; the discharge cylinder piston 130 is at the right hand end of the discharge cylinder 114; all the production cylinder pig holdback assemblies (PHB1; PHB2; PHB3; PHB4) are closed); buffer fluid pressure is raised to 250 bar by the auxiliary pump assembly 107—buffer fluid pressure: 250 bar Cycle C—the feed cylinder piston 122 moves from right to left; the feed cylinder inlet valve 148 is closed; the feed cylinder outlet valve 152 is opened; the discharge cylinder inlet valve 156 is opened; the discharge cylinder outlet valve 160 is closed; the discharge cylinder piston 130 moves from right to left; PHB3 is open; PHB4 is closed; feed fluid flows out of the feed cylinder 112 to the reactor assembly 100; product fluid is discharged from the reactor assembly 100 into the discharge cylinder 114; the auxiliary pump assembly 107 is used to maintain the pressure at system pressure: buffer fluid pressure—250 bar Cycle D—the feed cylinder piston 122 is at the right hand end of the feed cylinder 112, feed cylinder inlet valve 148 and feed cylinder outlet valve 152 are closed; discharge cylinder inlet valve 156 and discharge cylinder outlet valve 160 are closed; the discharge cylinder piston 130 is at the left hand side of the discharge cylinder 114; PHB1; PHB2; PHB3; PHB4 are closed; the auxiliary pump assembly 107 is used to reduce the system pressure: buffer fluid pressure—10 bar Repeat—Cycle repeats in this description: PHB1 is the pig holdback assembly on the feed cylinder inlet line 146; PHB2 is the pig holdback assembly on the feed cylinder outlet line 150; PHB3 is the pig holdback assembly on the discharge cylinder inlet line 154; and PHB4 is the pig holdback assembly on the discharge cylinder outlet line 158.

The buffer fluid and the auxiliary pump assembly 107 are used to develop, distribute, equalize and balance pressures within the buffer fluid sections 124, 132 of the pumps 112, 114.

To facilitate the use of a pipeline pig cleaning system, the process plant 109 achieves fluid flow-through continuity with the use of a second bank of positive displacement piston pumps 108.1, 108.2 that are operated as fluid accumulators. The first pump 108.1 is open to the process fluid outlet line 150 (to the reactor assembly 100) of the feed cylinder 112 and acts as a feed fluid accumulator. The second pump 108.2 is open to the process fluid inlet line 154 (from the reactor assembly 100) of the product cylinder 112 and acts as a product fluid accumulator. Both accumulator cylinders 108.1, 108.2 are acted upon by a plunger pump 108.3 that is hydraulically interlinked with the auxiliary pump assembly 107 to operate the feed fluid accumulator 108.1 and the product fluid accumulator 108.2 in contraflow to the primary pump assembly 103.

The accumulator arrangement including the pumps 108 obviates the need for the mini-piston 31 arrangement used in the product fluid discharge pumps 14 of FIG. 1.

In addition to the basic pump strokes, sequences will be programmed in to provide that, before the discharge cylinder inlet valve 156 opens to open the discharge cylinder 114 to reactor pressure, the buffer fluid pressure will be raised by the auxiliary pump assembly 107 (to 250 bar in the examples given above). This will ensure that the fluid pressure on either side of the discharge cylinder inlet valve 156 is substantially equal.

A similar sequence will reduce the buffer fluid pressure (to 10 bar in the examples given above) before opening the discharge cylinder outlet valve 160, to reduce the turbulence on the outflow of product fluid through the outlet line 158.

To do this, the inlet valve 156 to the discharge pump 114 shuts at the end of the charge stroke whilst the outlet valve 160 remains closed. The buffer cylinder plunger 136 then withdraws fractionally, thereby reducing the pressure in the discharge cylinder 128. Once the pressure in the discharge cylinder 128 has reduced, the outlet valve 160 to the product storage assembly 106 has no differential pressure across the valve 160 as it opens. In this manner, the discharge cycle allows the product fluid to be transferred to the product storage assembly 106 with minimal turbulence.

The apparatus described in the examples above finds particular application in feeding and discharging process fluids to and from high pressure reactors with the benefit that the fluid discharge volume varies in direct proportion to feed fluid input, which permits automatic volumetric discharge variation. In addition, the apparatus of the invention creates total separation between the feed and the discharge fluid streams through the use of separate feed and discharge pumps separated by one another by means of a buffer fluid.

Notwithstanding such separation, the fact that the apparatus of the invention can be combined in multiple pump banks enables virtually continuous flow operation with the added benefit that the buffer system and valving allows the product fluid to be transferred to the product fluid store with minimal turbulence.

What is claimed is:

1. A fluid feed and discharge apparatus for feeding a process fluid to and from a high pressure reactor configured to perform a relatively high pressure process, the high pressure reactor including a reactor in-feed and a reactor out-feed such that, respectively, unprocessed process fluid is fed into and processed process fluid is fed from the reactor, the apparatus comprising:
    a fluid feed pump for feeding unprocessed process fluid into the high pressure reactor;
    a fluid discharge pump for discharging the processed process fluid fed from the high pressure reactor;
    a fluid pressure buffer system comprising a buffer fluid pump and a fluid feed circuit that comprises buffer fluid lines that fluidly connect the buffer fluid pump with the fluid feed and fluid discharge pumps, the buffer fluid lines extending between the buffer fluid pump and the fluid feed and fluid discharge pumps, respectively;
wherein:
    the fluid feed and fluid discharge pumps each comprise a free piston reciprocally mounted within a cylinder dividing the cylinder into process fluid and buffer fluid sections, the process fluid sections of the cylinders each having a valve controlled process fluid inlet and outlet lines and the buffer fluid sections of the cylinders being in fluid communication by means of the fluid pressure buffer system;
    the fluid feed pump is connected, at its process fluid inlet line, to a supply of unprocessed process fluid under relatively low pressure and, at its process fluid outlet line, to the high pressure reactor in-feed such that unprocessed process fluid can be fed to the high pressure reactor under process pressure;
    the fluid discharge pump is connected, at its process fluid inlet line, to the reactor out-feed such that processed process fluid can be fed to the fluid discharge pump under process pressure and, at its process fluid outlet line, to a processed fluid store under relatively low pressure;
    the fluid feed and fluid discharge pumps each include valve means configured alternately to open and close the process fluid sections of the cylinders to relatively high process pressure and relatively low fluid in-feed and discharge pressure in alternating high- and low-pressure cycles in which:

in the low-pressure cycle, the fluid feed pump process fluid inlet and outlet lines are open and closed respectively to connect the process fluid section of the fluid feed pump to the supply of unprocessed process fluid under relatively low pressure and the fluid discharge pump process fluid inlet and outlet lines are closed and open respectively to connect the process fluid section of the fluid discharge pump to the processed fluid store under relatively low pressure; and in the high-pressure cycle, the fluid feed pump process fluid inlet and outlet lines are closed and open respectively to connect the process fluid section of the fluid feed pump to the high pressure reactor via the reactor in-feed and the fluid discharge pump process fluid inlet and outlet lines are open and closed respectively to connect the process fluid section of the fluid discharge pump to the high pressure reactor via the reactor out-feed;

and the buffer fluid pump is repeatedly operable:

in the low-pressure cycle, to reciprocate the pistons in the fluid feed pump and fluid discharge pump under the relatively low supply pressure of unprocessed process fluid filling the process fluid section of the fluid feed pump and to discharge the processed process fluid from the process fluid section of the fluid discharge pump to the processed fluid store;

and in the high-pressure cycle, to reciprocate the pistons in the fluid feed pump and fluid discharge pump under the relatively high process pressure of processed process fluid filling the process fluid section of the fluid discharge pump and to feed the unprocessed process fluid in the process fluid section of the fluid feed pump via the reactor in-feed to the high pressure reactor under process pressure.

2. The fluid feed and discharge apparatus of claim 1 in which the free pistons reciprocally mounted within the fluid feed and fluid discharge pumps are no more than hydraulically linked to the fluid pressure buffer system.

3. The fluid feed and discharge apparatus of claim 1 in which at least one of the free pistons reciprocally mounted within either or both the fluid feed and fluid discharge pumps is mechanically linked to the fluid pressure buffer system, the free piston being connected by means of a piston rod to a piston reciprocally mounted within the buffer fluid pump.

4. The fluid feed and discharge apparatus of claim 1, wherein the unprocessed process fluid is fed from a fluid supply assembly comprising at least two pumps driven in a predetermined ratio to mix and feed the unprocessed process fluid in an equivalent ratio.

5. The fluid feed and discharge apparatus of claim 1, wherein the fluid discharge pump includes a mini-piston configured to penetrate and occlude an enlarged mini-cylinder formed about the opening of the fluid discharge pump process fluid outlet line, the mini-piston being configured to enter the mini-cylinder and to raise the pressure in the mini-cylinder between the mini-piston and the fluid discharge pump inlet valve to a pressure at or near process pressure.

6. The fluid feed and discharge apparatus of claim 1, further comprising a pipeline pig cleaning system including a pig insertion station, a fluid feed pump pig holdback assembly coupled to the pig insertion station, a fluid discharge pump pig holdback assembly, and a pig recovery station, the pipeline pig cleaning system further including a plurality of pipeline pigs that are configured for feeding into the apparatus at the pig insertion station and transportation by the movement of the process fluid through the apparatus, the fluid feed pump process fluid inlet and outlet lines and the fluid discharge pump inlet and outlet lines being configured as through-flow, valve controlled process fluid lines connected on either side of a combination process fluid inlet/outlet line extending from the fluid feed pump and the fluid discharge pump, respectively.

7. The fluid feed and discharge apparatus of claim 6 wherein:

the pig insertion station includes an intermittently operable pig holdback assembly comprising a solenoid that is configured to release a predetermined quantity of pigs intermittently into the apparatus in the low-pressure cycle of the fluid feed and fluid discharge pumps, the pig release being timed to ensure that the pigs are released only when the fluid feed pump inlet valve is fully open and fluid is flowing to the fluid feed pump.

8. The fluid feed and discharge apparatus of claim 1, further comprising at least a first fluid accumulator and a second fluid accumulator, the first fluid accumulator comprising a pump that is open to the reactor in-feed end of the fluid feed pump and is configured to operate as an unprocessed fluid accumulator, the second fluid accumulator comprising a second pump that is open to the reactor out-feed end of the fluid discharge pump and is configured to act as a processed fluid accumulator, wherein both the first and second fluid accumulators are fluidly coupled to and acted upon by a plunger pump, the plunger pump configured to operate the first and second fluid accumulators in contraflow to the fluid feed pump and fluid discharge pump.

9. The fluid feed and discharge apparatus of claim 1, wherein the apparatus is configured for supercritical water treatment of used oil.

10. A method of feeding and discharging a process fluid to and from a relatively high pressure process performed in a high pressure reactor that includes a reactor in-feed and a reactor out-feed such that, respectively, unprocessed process fluid is fed into and processed process fluid is fed from the high pressure reactor, the method comprising:

from a fluid feed pump, feeding unprocessed process fluid into the high pressure reactor;

from a fluid discharge pump, discharging the processed process fluid fed from the high pressure reactor process;

connecting, with a buffer fluid circuit, a fluid pressure buffer system comprising a buffer fluid pump with the fluid feed and fluid discharge pumps, the buffer fluid circuit comprising buffer fluid lines extending between the buffer fluid pump and the fluid feed and fluid discharge pumps, respectively;

wherein the fluid feed and fluid discharge pumps each comprise a free piston reciprocally mounted within a cylinder dividing the cylinder into process fluid and buffer fluid sections, the process fluid sections of the cylinders each having valve controlled process fluid inlet and outlet lines and the buffer fluid sections of the cylinders are in fluid communication by means of the fluid pressure buffer system;

connecting the fluid feed pump, at its process fluid inlet line, to a supply of unprocessed process fluid under relatively low pressure and, at its outlet, to the reactor in-feed by means of which unprocessed process fluid may be fed to the high pressure reactor under process pressure;

connecting the fluid discharge pump, at its process fluid inlet line, to a process out-feed such that processed process fluid is fed to the fluid discharge pump under process pressure and, at its process fluid outlet line, to a processed fluid store under relatively low pressure;

the fluid feed and fluid discharge pumps each including valve means configured alternately to open and close the process fluid sections of the cylinders to relatively high process pressure and relatively low fluid in-feed and discharge pressure in alternating high- and low-pressure cycles and the method including the steps of operating the valves such that:

in the low-pressure cycle, the fluid feed pump process fluid inlet and outlet lines are open and closed respectively to connect the process fluid section of the fluid feed pump to the supply of unprocessed process fluid under relatively low pressure and the fluid discharge pump process fluid inlet and outlet lines are closed and open respectively to connect the process fluid section of the fluid discharge pump to the processed fluid store under relatively low pressure thereby exposing the process fluid sections of the fluid discharge and fluid feed pump cylinders to low/ambient pressure;

in the high-pressure cycle, the fluid feed pump process fluid inlet and outlet lines are closed and open respectively to connect the process fluid section of the fluid feed pump to the high pressure reactor by way of the reactor in-feed and the fluid discharge pump process fluid inlet and outlet lines are open and closed respectively to connect the process fluid section of the fluid discharge pump to the high pressure reactor by way of the reactor out-feed, thereby exposing the process fluid sections of the fluid discharge and fluid feed pump cylinders to process pressure;

and operating the buffer fluid pump repeatedly:

in the low-pressure cycle, to reciprocate the pistons in the fluid feed pump and fluid discharge pump under the relatively low supply pressure of unprocessed process fluid filling the process fluid section of the fluid feed pump and to discharge the processed process fluid from the process fluid section of the fluid discharge pump to the processed fluid store; and in the high-pressure cycle, to reciprocate the pistons in the fluid feed pump and fluid discharge pump under the relatively high process pressure of processed process fluid filling the process fluid section of the fluid discharge pump and to feed the unprocessed process fluid in the process fluid section of the fluid feed pump by way of the reactor in-feed to the high pressure reactor under process pressure.

11. The method of claim 10, further comprising feeding the unprocessed process fluid from a fluid supply assembly comprising at least two pumps and driving the pumps in a predetermined ratio to mix and feed the unprocessed process fluid in an equivalent ratio.

12. The method of claim 10, further comprising, in a transition between high- and low pressure cycles, operating the pumps and valves such that the pressure across the pump pistons and valves is substantially equal at all times.

13. The method of claim 10, wherein the method is for supercritical water treatment of used oil.

\* \* \* \* \*